US009851207B2

(12) United States Patent
Wang et al.

(10) Patent No.: US 9,851,207 B2
(45) Date of Patent: Dec. 26, 2017

(54) NAVIGATION SYSTEM WITH COMMUNICATION MECHANISM AND METHOD OF OPERATION THEREOF

(71) Applicant: Telenav, Inc., Sunnyvale, CA (US)

(72) Inventors: Rudong Wang, Milpitas, CA (US); Richard Jingwen Yang, Mountain View, CA (US); Hongwei Feng, Palo Alto, CA (US); HaiPing Jin, Saratoga, CA (US); Xinan Cheng, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 97 days.

(21) Appl. No.: 14/719,016

(22) Filed: May 21, 2015

(65) Prior Publication Data

US 2015/0338219 A1    Nov. 26, 2015

Related U.S. Application Data

(60) Provisional application No. 62/002,278, filed on May 23, 2014.

(51) Int. Cl.
*G01C 21/26* (2006.01)
*H04L 12/58* (2006.01)
(Continued)

(52) U.S. Cl.
CPC ............. *G01C 21/26* (2013.01); *G01C 21/34* (2013.01); *G01C 21/3697* (2013.01);
(Continued)

(58) Field of Classification Search
CPC .... G01C 21/32; G01C 21/34; G01C 21/3611; G01C 21/362; G01C 21/36; G01C 21/20; G01C 21/00; G01C 21/3492; G01C 21/3691; G06F 17/30867; G06F 17/30; G06F 3/04883; G06F 3/0488; G06F 3/033; G06F 3/041; H04W 12/04; H04W 12/06; H04W 4/046; H04W 4/025; H04W 4/04; H04W 4/02; H04W 4/001; H04W 24/02; H04W 24/08; H04W 4/00; H04W 52/02; H04W 36/00; H04M 1/66; H04M 1/27455; H04M 11/00; H04M 1/72572; H04Q 7/20; G01S 19/35; G01S 1/00; H04L 43/00; H04L 12/28; H04L 41/12; H04L 12/26
See application file for complete search history.

(56) References Cited

U.S. PATENT DOCUMENTS 6,401,029 B1 * 6/2002 Kubota .............. G01C 21/3611
701/408
6,785,540 B1 * 8/2004 Wichelman ............. H04L 41/22
455/423
(Continued)

*Primary Examiner* — Behrang Badii
(74) *Attorney, Agent, or Firm* — IP Investment Law Group

(57) ABSTRACT

A method of operation of a navigation system includes: identifying a navigational context for representing a user; determining a participant identification based on the navigational context for representing a participant, the participant identification including a familiarity rating; and generating a communication channel with a control unit during a navigation session based on the navigational context for communicating a message between the user and the participant independent of the familiarity rating.

20 Claims, 8 Drawing Sheets

(51) Int. Cl.
  *G01C 21/34* (2006.01)
  *G08G 1/0967* (2006.01)
  *G01C 21/36* (2006.01)
  *H04W 4/00* (2009.01)
  *G01C 21/32* (2006.01)
  *G06F 17/30* (2006.01)
  *G08G 1/0968* (2006.01)

(52) U.S. Cl.
  CPC . *G08G 1/096716* (2013.01); *G08G 1/096741* (2013.01); *G08G 1/096775* (2013.01); *H04L 51/046* (2013.01); *H04L 51/20* (2013.01); *G01C 21/32* (2013.01); *G01C 21/3484* (2013.01); *G01C 21/3492* (2013.01); *G01C 21/3629* (2013.01); *G01C 21/3691* (2013.01); *G06F 17/30867* (2013.01); *G08G 1/096811* (2013.01); *H04W 4/008* (2013.01)

(56) References Cited

U.S. PATENT DOCUMENTS

| | | |
|---|---|---|
| 8,548,503 B2 | 10/2013 | Oh |
| 2001/0001848 A1* | 5/2001 | Oshizawa .......... G01C 21/3492 701/414 |
| 2004/0148275 A1* | 7/2004 | Achlioptas ........ G06F 17/30867 |
| 2008/0076410 A1* | 3/2008 | Beyer ............... H04M 1/72572 455/425 |
| 2009/0033552 A1* | 2/2009 | Kirmuss ................ G01C 21/20 342/357.75 |
| 2012/0254328 A1 | 10/2012 | Lee |
| 2013/0288716 A1* | 10/2013 | Kwon .................. H04W 4/046 455/456.3 |
| 2014/0005941 A1 | 1/2014 | Pack et al. |

* cited by examiner

NAVIGATION SYSTEM WITH COMMUNICATION MECHANISM AND METHOD OF OPERATION THEREOF

CROSS-REFERENCE TO RELATED APPLICATION(S)

This application claims the benefit of U.S. Provisional Patent Application Ser. No. 62/002,278 filed May 23, 2014, and the subject matter thereof is incorporated herein by reference thereto.

TECHNICAL FIELD

An embodiment of the present invention relates generally to a navigation system, and more particularly to a system with a communication mechanism.

BACKGROUND ART

Modern consumer and industrial electronics, especially devices such as graphical navigation systems, televisions, projectors, cellular phones, portable digital assistants, and combination devices, are providing increasing levels of functionality to support modern life including location-based information services. Research and development in the existing technologies can take a myriad of different directions.

As users become more empowered with the growth of mobile communication technology, new and old paradigms begin to take advantage of this new space. One such space is enabling communication between users in the context of traveling and driving. The possible applications for communicating relative to the context of traveling and driving have yet been fully utilized.

Thus, a need still remains for a navigation system with a communication mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

An embodiment of the present invention provides a method of operation of a navigation system including: identifying a navigational context for representing a user; determining a participant identification based on the navigational context for representing a participant, the participant identification including a familiarity rating; and generating a communication channel with a control unit during a navigation session based on the navigational context for communicating a message between the user and the participant independent of the familiarity rating.

An embodiment of the present invention provides a navigation system, including: a control unit for: identifying a navigational context for representing a user, determining a participant identification based on the navigational context for representing a participant, the participant identification including a familiarity rating, generating a communication channel with a control unit during a navigation session based on the navigational context for communicating a message between the user and the participant independent of the familiarity rating; and a communication unit, coupled to the control unit, for communicating the message.

An embodiment of the present invention provides a non-transitory computer readable medium including instructions for a navigation system, including: identifying a navigational context for representing a user; determining a participant identification based on the navigational context for representing a participant, the participant identification including a familiarity rating; and generating a communication channel with a control unit during a navigation session based on the navigational context for communicating a message between the user and the participant independent of the familiarity rating.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
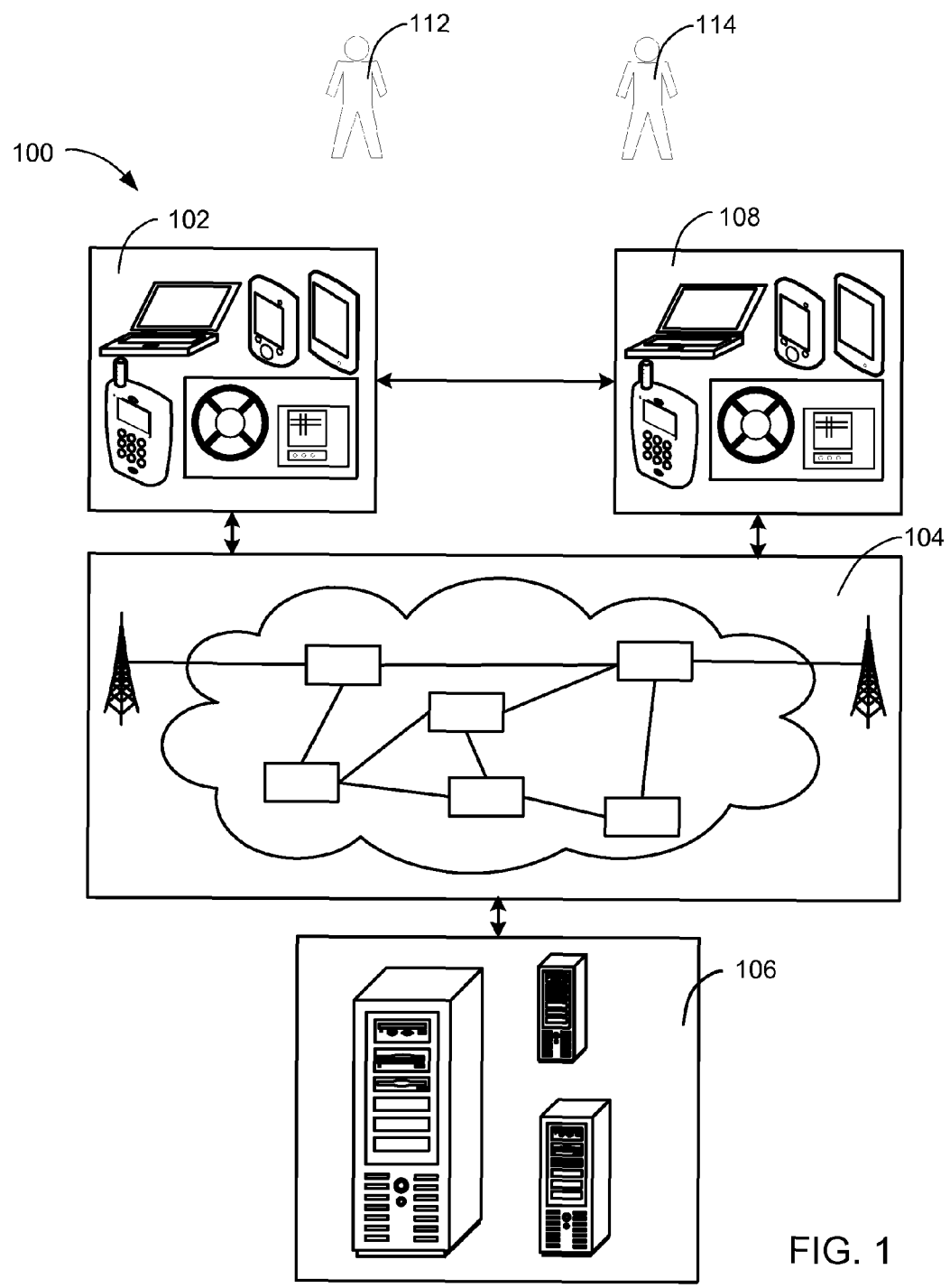
FIG. 1 is a navigation system with a communication mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

One skilled in the art would appreciate that the format with which navigation information is expressed is not critical to some embodiments of the invention. For example, in some embodiments, navigation information is presented in the format of (X, Y); where X and Y are two coordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein can include the navigation information described as well as information relating to points of interest to the user, such as local business, hours of businesses, types of businesses, advertised specials, traffic information, maps, local events, and location based community or personal information.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

Referring now to FIG. 1, therein is shown a navigation system 100 with a communication mechanism in an embodiment of the present invention. The navigation system 100 includes a first device 102, such as a client or a server, connected to a second device 106, such as a client or server. The first device 102 can communicate with the second device 106 with a network 104, such as a wireless or wired network.

For example, the first device 102 can be of any of a variety of consumer devices, such as a cellular phone, a personal digital assistant, a notebook computer, a tablet computer, a wearable device, an automotive telematics navigation system, or other multi-functional mobile communication or entertainment device. The first device 102 can couple, either directly or indirectly, to the network 104 to communicate with the second device 106 or can be a stand-alone device. The first device 102 can further be separate from or incorporated with a vehicle, such as a car, truck, bus, or train.

For illustrative purposes, the navigation system 100 is described with the first device 102 as a mobile computing device, although it is understood that the first device 102 can be different types of devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single room, distributed across different rooms, distributed across different geographical locations, embedded within a telecommunications network. The second device 106 can couple with the network 104 to communicate with the first device 102. The second device 106 can also be a client type device as described for the first device 102.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, such as a car, a truck, a bus, or a train.

Also for illustrative purposes, the navigation system 100 is described with the second device 106 as a computing device, although it is understood that the second device 106 can be different types of devices. Also for illustrative purposes, the navigation system 100 is shown with the second device 106 and the first device 102 as end points of the network 104, although it is understood that the navigation system 100 can have a different partition between the first device 102, the second device 106, and the network 104. For example, the first device 102, the second device 106, or a combination thereof can also function as part of the network 104.

The network 104 can span and represent a variety of networks. For example, the network 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the network 104. Further, the network 104 can traverse a number of network topologies and distances. For example, the network 104 can include direct connection, personal area network (PAN), local area network (LAN), metropolitan area network (MAN), wide area network (WAN), or a combination thereof.

The navigation system 100 can further include a third device 108. The third device 108, such as a client or a server, can be connected to the first device 102, the second device 106, or a combination thereof. The third device 108 can be similar to the first device 102, the second device 106, or a combination thereof.

For example, the third device 108 can include any variety of consumer devices, such as a smart phone, a tablet computer, a laptop computer, a wearable device, an automotive telematics navigation system, or a combination thereof. The third device 108 can couple, either directly or indirectly, to the network 104 to communicate with another device, couple directly to another device, or can be a stand-alone device. The third device 108 further be separate from or incorporated with a vehicle, such as a car, truck, bus, or train.

For illustrative purposes, the navigation system 100 is described with the third device 108 as a mobile computing device, although it is understood that the third device 108 can be different types of devices. For example, the third device 108 can also be a non-mobile computing device, such as a server, a server farm, or a desktop computer.

The first device 102, the second device 106, the third device 108, or a combination thereof can be associated with an end user, such as a user 112, a participant 114, or a combination thereof. The user 112 can include a person or an entity owning, operating, controlling, carrying, or a combination thereof for one or more of the devices in the navigation system 100.

Similarly, the participant 114 can include a person or an entity different from the user 112 and owning, operating, controlling, carrying, share, or a combination thereof for one or more of the devices in the navigation system 100. The user 112 and the participant 114 can own, operate, control, carry, share, or a combination thereof for same or different devices between the user 112 and the participant 114.

For illustrative purposes, the user 112 will be described as being associated with the first device 102. However, it is understood that the user 112 can be associated with different devices, such as the third device 108 or the second device 106. For further illustrative purposes, the participant 114 will be described as being associated with the third device 108. However, it is understood that the participant 114 can be associated with any other device, such as the first device 102 or the second device 106.

Also for illustrative purposes the navigation system 100 will be described for implementing the first device 102 for the user 112 with the second device 106 in facilitating communication with the participant 114. However, it is understood that the navigation system 100 can similarly facilitate communication with a different user, a different device, multiple users or devices, or a combination thereof. It is further understood that the navigation system 100 can similarly manage communication for the third device 108 or other devices from their perspective.

Figure 2:
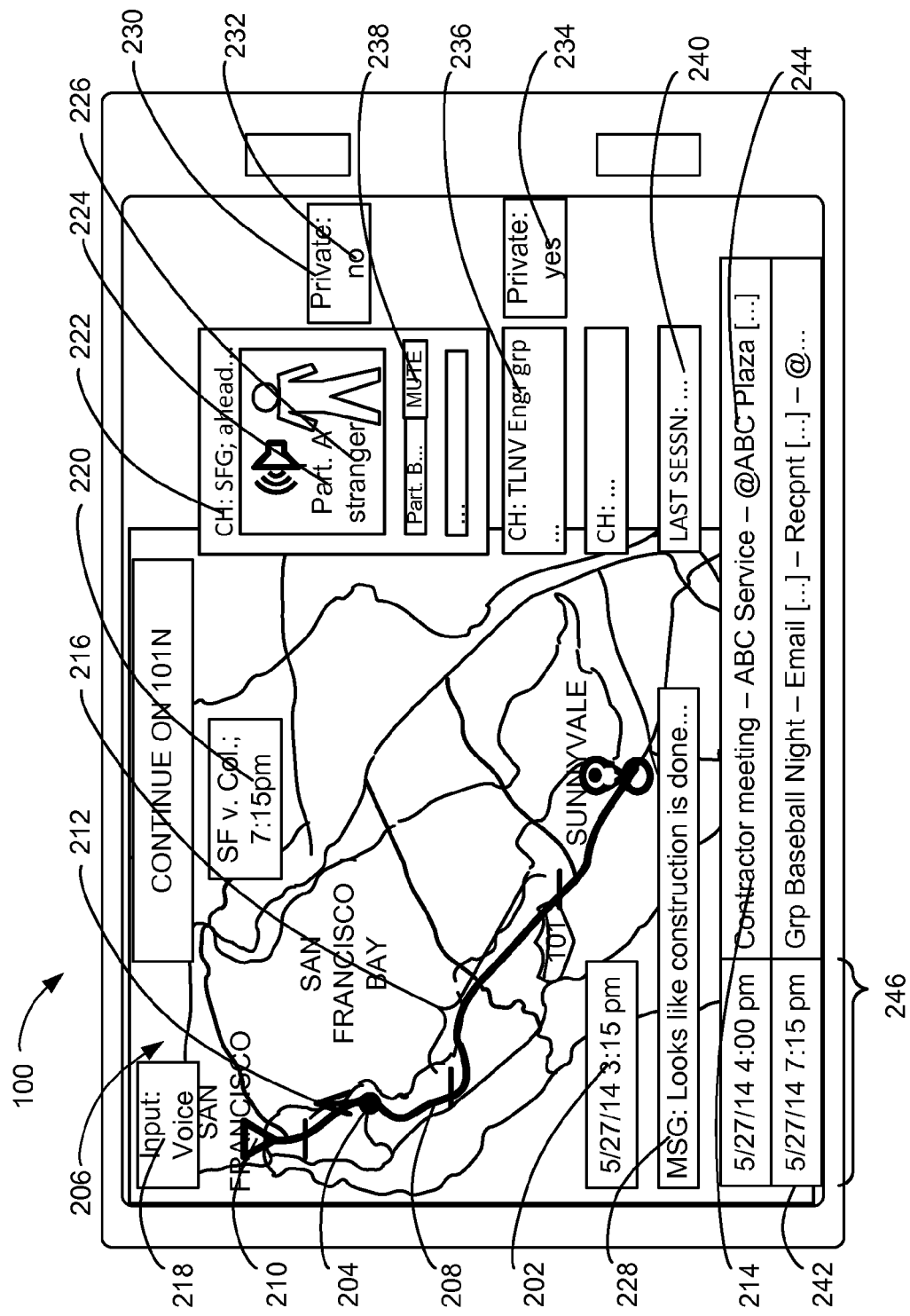
FIG. 2 is an example of a display interface of the first device.

Referring now to FIG. 2, therein is shown an example of a display interface of the first device 102. The first device 102 can show a current time 202, a current location 204, or a combination thereof. The current time 202 can be based on a system clock, a time zone, a server clock, a universal clock, or a combination thereof.

The current location 204 can represent a geographic location at the current time 202 for the first device 102, the second device 106 of FIG. 1, the third device 108 of FIG. 1, or a combination thereof. The current location 204 further represent the geographic location of the user 112 of FIG. 1, the participant 114 of FIG. 1, or a combination thereof associated with the first device 102, the second device 106, the third device 108, or a combination thereof.

The navigation system 100 of FIG. 1 can further include a navigation session 206 for the first device 102, the second device 106, the third device 108, or a combination thereof. The navigation session 206 is an implementation or usage of a feature for aiding travel.

The navigation session 206 can be a grouping of resources, such as time, computing capabilities, associated features or functionalities, or a combination thereof for guiding the user 112 or the participant 114. For example, the navigation session 206 can include an instance of invoking or utilizing the navigational guidance, map, travel-related features or functionalities of the navigation system 100 or a combination thereof.

The navigation session 206 can include a travel route 208, a travel destination 210, a travel direction 212, a travel purpose 214, a route segment 216, or a combination thereof. The travel route 208 can include a series of connected paths for traversing to a travel destination 210. The travel route 208 can include one or more edges joined by one or more nodes forming a continuous path to the travel destination 210. The travel route 208 can include maneuvers corresponding to the nodes for the user 112 or the participant 114 to follow or traverse the travel route 208.

The travel route 208 can be from the current location 204, from a starting location of the user 112 or the participant 114, from an arbitrary starting point, or a combination thereof. The travel route 208 can end at the travel destination 210 or include an instance of the travel destination 210 as a stop or an intermediate objective within the travel route 208. The travel destination 210 can be an intended location or an objective of the traveling activity.

The travel direction 212 can be information regarding a bearing for a movement or an orientation of the first device 102, the second device 106, the third device 108, the user 112 or the participant 114 associated therewith, or a combination thereof. The travel direction 212 can include the bearing or the orientation relative to the travel route 208, during the navigation session 206, at the current time 202, or a combination thereof.

The travel purpose 214 can be a representation of an abstract reason for the navigation session 206. The travel purpose 214 can be a goal or an activity associated with the navigation session 206 or the travel destination 210. For example, the travel purpose 214 can include a shopping list at an establishment or a shop at the travel destination 210. Also for example, the travel purpose 214 can include one or more events or activities scheduled for the user 112 or the participant 114 occurring at or within a predetermined distance from the travel destination 210.

The route segment 216 can be a unit or a grouping of paths within the travel route 208. The route segment 216 can include paths having common identification, such as a highway number or a street name. The route segment 216 can further be divisions or groupings based on distance or speed, exits or cross streets, number of occupants or travelers, geographical characteristic, such as for region or orientation of the path, path characteristic, such as number of lanes or traffic regulation, or a combination thereof.

The navigation system 100 can use a non-contact command mechanism 218 for managing interactions with the first device 102, the second device 106, the third device 108, or a combination thereof. The non-contact command mechanism 218 is a method or a process of interaction between a device and a user of the device excluding receiving information based on physical contact. The non-contact command mechanism 218 can include commanding or operating the first device 102, the second device 106, the third device 108, or a combination thereof based on non-contact input information from the user 112 or the participant 114 associated thereto.

For example, the non-contact command mechanism 218 can include voice commands, motion commands, gesture commands, or a combination thereof. Also for example, the non-contact command mechanism 218 can include commanding or operating based on contextual input, physiological cues, such as eye movement, heart rate, detectable brain activity, or a combination thereof.

The navigation system 100 can use a navigational context 220 for generating a communication channel 222. The navigational context 220 is abstract information giving meaning to the navigational activity. The navigational context 220 can include situation, purpose, motivation, meaning, value, or a combination thereof.

The navigational context 220 can include information associated with or connected to the navigation session 206. For example, the navigational context 220 can include the travel route 208, the travel destination 210, the travel direction 212, the route segment 216, the current location 204, or a combination thereof.

The communication channel 222 is a medium for relaying information between users of the navigation system 100. The communication channel 222 can be for exchanging information, such as by sending, receiving, recording, replaying, displaying, or a combination thereof for various information.

For example, the communication channel 222 can include transmitting and receiving of information between the first device 102, the second device 106, the third device 108, or a combination thereof. Also for example, the communication channel 222 can include exchange of information between a device and its user, such as between the first device 102, the second device 106, the third device 108, or a combination thereof and the user 112 or the participant 114 associated thereto.

The communication channel 222 can include a method or a process for exchanging the information, such as protocols or frequencies. The communication channel 222 can further include a connection or a link between devices for exchanging information. The communication channel 222 can further include a representation of the connection or an environment for sharing the information, such as a chat room, a common frequency, a common access, or a combination thereof.

For illustrative purposes, the communication channel 222 will be described as from the perspective of the user 112 for communicating with the participant 114. However, it is understood that the communication channel 222 can provide the same features or functionalities with respect to the participant 114. Further, the communication channel 222 can accommodate different users or multiple users.

The communication channel 222 can include a participant identification 224, a familiarity rating 226, a message 228, a privacy setting 230, or a combination thereof. The participant identification 224 can name communicating parties of the communication channel 222. The participant identification 224 can include identification information representing the participant 114 or other parties sending messages to, receiving messages from, sharing messages with, or a combination thereof regarding the user 112.

The participant identification 224 can include a name, a screen name, a contact information, such as phone number of email address, a vehicle information, or a combination thereof. The participant identification 224 can further include a temporary or an anonymous moniker for identifying specific to the communication channel 222, the information, or a combination thereof.

The familiarity rating 226 is a representation of an existing relationship between the communicating parties. The familiarity rating 226 can be with respect to the user 112. The familiarity rating 226 can represent previous communications or interactions between the communicating parties.

The familiarity rating 226 can represent a type or a nature of connection, a degree of connection, or a combination thereof between the user 112 and the participant 114 or other communicating parties. For example, the familiarity rating 226 can be based on predetermined categories of relationships, such as stranger, friend, coworker, family, or a combination thereof.

Also for example, the familiarity rating 226 can be based on an arbitrary scale representing a degree of familiarity, a frequency or an amount, or a combination thereof for interaction between the parties. Also for example, the familiarity rating 226 can be based on context for the relationship or connection.

The message 228 can include information intended to be shared between the communicating parties. The message 228 can be audible content, text-based message, visual content, or a combination thereof. For example, the message 228 can be information intended by the user 112 to be sent to the participant 114 from the first device 102 to the third device 108, or to other devices for other users. Also for example, the message 228 can be information intended to by the participant 114 or other users to be received by the user 112.

The privacy setting 230 can be a type or a restriction regarding availability of the communication channel 222 external to the communicating parties. For example, the privacy a public setting 232, a private setting 234, or a combination thereof. The public setting 232 is a type or a restriction for the communication channel 222 availing accessibility to users other than the communication participants. The public setting 232 can facilitate other users, other than the user 112 and the participant 114, to access the message 228, join the communication channel 222, or a combination thereof.

The private setting 234 is a type or a restriction for the communication channel 222 limiting availability to only to selected parties. The private setting 234 can be based on membership, agreement between the communicating parties in the communication channel 222, or a combination thereof.

The communication channel 222 can further accommodate a communication grouping 236. The communication grouping 236 is a connection between multiple parties for one instance of the communication channel 222. The communication grouping 236 can include a caravan, a fleet, a group of vehicles intending to travel as a group, or a combination thereof. The communication grouping 236 can further be based on common instance of membership, destination, purpose, time, location, or a combination thereof.

The communication channel 222 can include a mute setting 238. The mute setting 238 can be a feature available to a specific user for silencing the message 228 from a particular party or device, based on a particular context or condition, or a combination thereof.

For example, the mute setting 238 can be the feature available to the user 112 for silencing or not accepting the message 228 particularly from the participant 114 or a specific user. Also for example, the mute setting 238 can be the feature available to the user 112 to only receive the message 228 associated with a specific instance of the navigational context 220, emergencies, or a combination thereof.

The navigation system 100 can further use an external context for generating the communication channel 222. For example, the navigation system 100 can use a usage profile 240, a schedule event 242, or a combination thereof.

The usage profile 240 is information regarding previous interaction between a person and the navigation system 100. The usage profile 240 can include records of previous instances of the navigation session 206, the communication channel 222, or a combination thereof corresponding to the user 112, the participant 114, a different user, or a combination thereof. The usage profile 240 can further include preference, settings, configurations, patterns, or a combination thereof for the user 112, the participant 114, the different user, or a combination thereof.

The schedule event 242 is an identified activity, occasion, happening, gathering, or a combination thereof. The schedule event 242 can correspond to the user 112, the participant 114, the different user, or a combination thereof. The schedule event 242 can be based on a calendar or a scheduler, such as a meeting or a reminder occurring in personal or group calendar or scheduling applications, The schedule event 242 can include a schedule location 244, a schedule time 246, or a combination thereof. The schedule location 244 can represent a geographic location or region associated with the schedule event 242. The schedule location 244 can represent the geographic location or region hosting the schedule event 242 or where the schedule event 242 will occur, is occurring, or has occurred. The schedule time 246 can represent a time or a period associated with the schedule event 242. The schedule time 246 can represent when the schedule event 242 occurred, will occur, or the current time 202.

The navigation system 100 can generate the communication channel 222 for connecting the user 112 and the participant 114 based on the navigational context 220, the external context, or a combination thereof. The navigation system 100 can facilitate communication based on contextual relevancy, beyond sharing a geographic proximity. Details regarding generation of the communication channel 222 will be described below.

Figure 3:
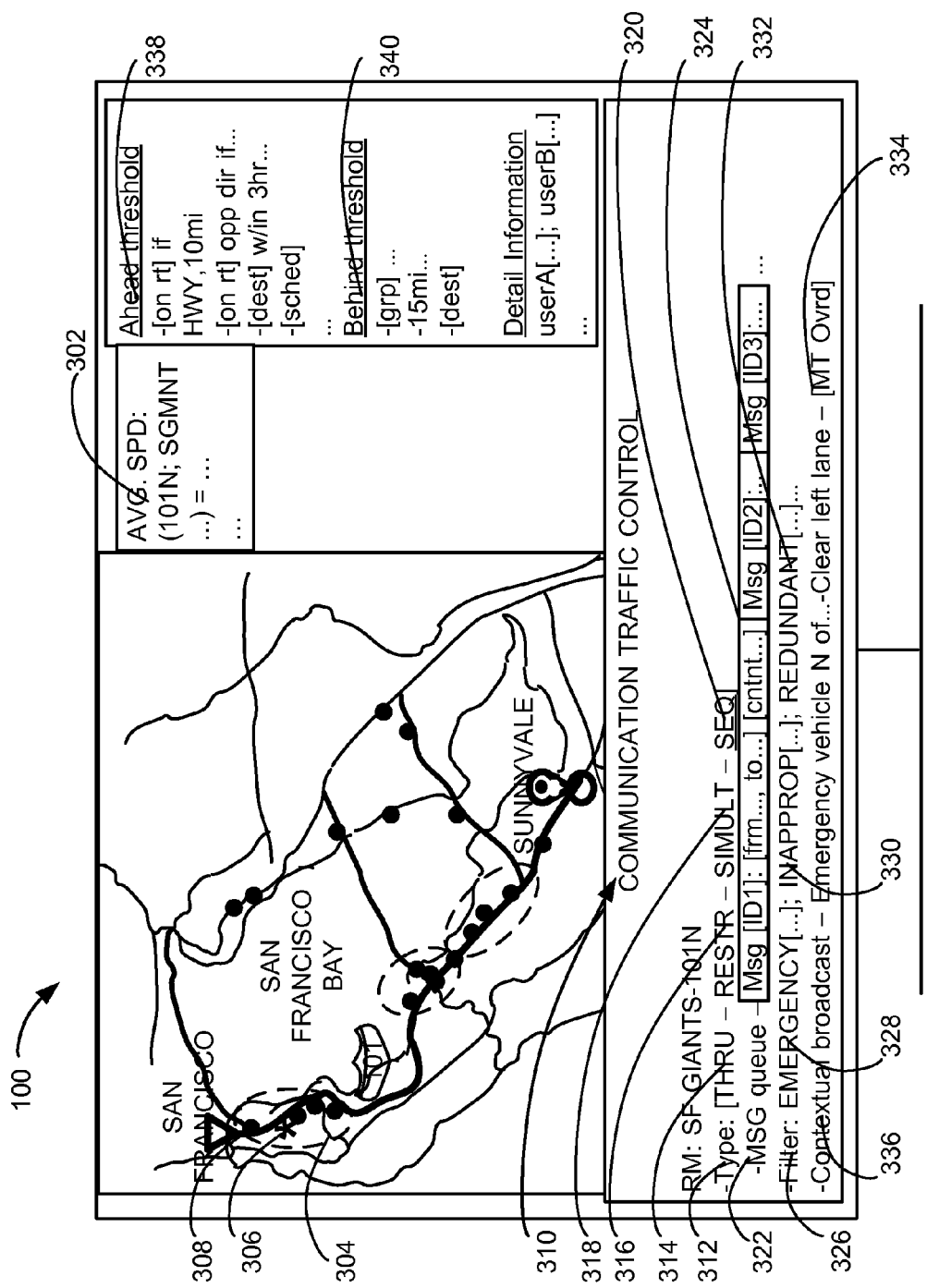
FIG. 3 is an example of a display interface of the second device.

Referring now to FIG. 3, therein is shown an example of a display interface of the second device 106. The navigation system 100 of FIG. 1 can determine a traffic flow 302. The traffic flow 302 can be a rate of movement for vehicles for a corresponding location or path. The traffic flow 302 can be represented as an average speed, a relevant event, such as an accident or a construction, number of vehicles, or a combination thereof for the corresponding location or path. The traffic flow 302 can be based on real-time data, historical information, feedback from the first device 102 of FIG. 1, the third device 108 of FIG. 1, or a combination thereof.

The navigation system 100 can generate a geographical grouping 304 for communicating the message 228 of FIG. 2. The geographical grouping 304 is spatial connection between users of the navigation system 100. The geographical grouping 304 can be based on the current location 204 of FIG. 2 of the individual users of the navigation system 100. The geographical grouping 304 can be groupings of various individual users based on geography, such as distance or usage of common path. The geographical grouping 304 can be based on the current time 202 of FIG. 2 or across different times.

The geographical grouping 304 can include detail information for each of the individual users. The detail information can include various information, such as the navigation session 206 of FIG. 2, the navigational context 220 of FIG. 2, the external context, or a combination thereof corresponding to each of the individual users.

For example, the detail information can include a user-detail 306 and a participant-detail 308. The user-detail 306 can be the detail information corresponding to the user 112 of FIG. 1 or the first device 102 corresponding to the user 112. As a more specific example, the user-detail 306 can include the navigation session 206, the navigational context 220, the usage profile 240 of FIG. 2, the schedule event 242 of FIG. 2, or a combination thereof corresponding to the user 112.

Similarly, the participant-detail 308 can include the detail information corresponding to the participant 114. As a more specific example, the participant-detail 308 can include the navigation session 206, the navigational context 220, the usage profile 240, the schedule event 242, or a combination thereof corresponding to the participant 114.

The navigation system 100 can use a communication traffic control 310 to generate and manage the communication channel 222 of FIG. 2. The communication traffic control 310 is a process or a method for managing instances of the message 228 for one or more instances of the communication channel 222 of FIG. 2. The communication traffic control 310 can be hardware, software, firmware, or a combination thereof for generating the communication channel 222, identifying or grouping parties therein, managing communication of the message 228, or a combination thereof.

For example, the communication traffic control 310 can identify the participant identification 224 of FIG. 2 based on the geographical grouping 304 in generating the communication channel 222. The communication traffic control 310 can identify the participant identification 224 further based on the navigational context 220, the external context, or a combination thereof. Also for example, the communication traffic control 310 can control a method, a timing, or a combination thereof for communicating the message 228.

The communication traffic control 310 can manage the communication channel 222 using a session type 312. The session type 312 is a representation of the method, the timing, or a combination thereof for communicating the message 228. The session type 312 can be specific each instance of the communication channel 222. The session type 312 can be for addressing a delayed access of the message 228, managing multiple instances of the message 228, managing multiple sources of the message 228, or a combination thereof.

The session type 312 can include a throughput mode 314, a restorable mode 316, a simultaneous mode 318, a sequential mode 320, or a combination thereof. The throughput mode 314 is an instance of the session type 312 for not retaining the message 228 for access after communication. The throughput mode 314 can include the second device 106 or the communication traffic control 310 deleting the message 228 after delivery to the first device 102, the third device 108, other end user devices, or a combination thereof. For example, the communication channel 222 utilizing the throughput mode 314 can operate similar to communicating with walkie-talkies or traditional telephones.

The restorable mode 316 is an instance of the session type 312 retaining the message 228 for access after communication. The restorable mode 316 can include the second device 106 or the communication traffic control 310 storing the message 228 after delivery to the first device 102, the third device 108, other end user devices, or a combination thereof. The message 228 can be delivered after the initial delivery to the original recipient or a different recipient.

The simultaneous mode 318 is an instance of the session type 312 where all multiple instances of the message 228 can be simultaneously communicated. For example, the simultaneous mode 318 can include the user 112 and the participant 114 to transmit and receive simultaneously, such as simultaneously talking and simultaneously hearing for both of the parties. Also for example, the simultaneous mode 318 can include delivering all simultaneously sourced instances of the message 228 from multiple users to one or more recipients. As a more specific example, the simultaneous mode 318 can be similar to the telephone or the conference call enabling multiple simultaneous speakers and multiple simultaneous listeners.

The sequential mode 320 is an instance of the session type 312 where only one instance of the message 228 is communicated to one or more parties. The sequential mode 320 can eliminate simultaneous outputs. The sequential mode 320 can delay the communication of the message 228 for accommodating multiple simultaneous inputs.

The sequential mode 320 can include a message queue 322, a communication sequence 324, or a combination thereof. The message queue 322 is a collection or a grouping of instances of the message 228 intended or awaiting for delivery in the communication channel 222. The communication sequence 324 is an order or a sequence for the instances of the message 228 in the message queue 322. The communication sequence 324 can represent an order of delivery for the instances of the message 228.

For example, the communication traffic control 310 can deliver or transmit one instance of the message 228 at a time to the first device 102, the third device 108, or a combination thereof. The communication traffic control 310 can store the instances of the message 228 in the message queue 322 in the order of origination or reception at the communication traffic control 310 to determine the communication sequence 324. The communication traffic control 310 can further store the instances of the message 228 in the message queue 322 based on a determined importance, urgency, relevancy, or a combination thereof amongst the instances of the message 228.

The communication traffic control 310 can further include a content filter 326. The content filter 326 is a method, a process, a mechanism, or a combination thereof for detecting or determining specific information within the message 228. The content filter 326 can be based on analyzing the content of the message 228, the navigational context 220 or the external context associated with the message 228, or a combination thereof.

The content filter 326 can determine an emergency context 328, an inappropriate content 330, a redundant content 332, or a combination thereof. The emergency context 328 is a situation or a condition associated with urgency or danger. The emergency context 328 can include a medical emergency, a disaster, a crisis, or a combination thereof.

The inappropriate content 330 can include information restricted from communication between parties. The inappropriate content 330 can include specific words, phrases, sounds, images, links, or a combination thereof flagged by a community or the navigation system 100 as being prohibited. The inappropriate content 330 can be specific to a combination of the parties within in the communication channel 222. The inappropriate content 330 can be based on the familiarity rating 226 of FIG. 2 between the communicating parties, the navigational context 220, the external context, or a combination thereof.

The redundant content 332 can include multiple instances of the message 228 conveying identical or similar information. For example, the redundant content 332 can be multiple accurate answers from multiple users for a single question. The navigation system 100 can remove the redundant content 332 for eliminating unnecessary duplication of information. The navigation system 100 can remove the message 228 corresponding to the redundant content 332 from the message queue 322.

The communication traffic control 310 can further include a mute override 334. The mute override 334 is a feature or a function for ignoring the mute setting 238 of FIG. 2 and communicating the message 228 to an end user. The mute override 334 can ensure that the message 228 is communicated to the end user, such as by recreating the sound or displaying the information using the first device 102, the third device 108, a different end-user device, or a combination thereof. The mute override 334 can be based on the navigational context 220, the external context, the emergency context 328, or a combination thereof.

The communication traffic control 310 can further include a contextual broadcast 336. The contextual broadcast 336 is an instance of the message 228 intended for communication regardless of the communication channel 222. The contextual broadcast 336 can be communicated to multiple parties based on the navigational context 220, the external context, the emergency context 328, or a combination thereof. The contextual broadcast 336 can be further based on the mute override 334.

The communication traffic control 310 can use an ahead threshold 338, a behind threshold 340, or a combination thereof. The ahead threshold 338 and the behind threshold 340 are each one or a set of parameters for geographically limiting communication parties for the communication channel 222. The ahead threshold 338 can be along the travel direction 212 of FIG. 2 for a communication party and the behind threshold 340 can be opposite the travel direction 212 of the communication party.

The ahead threshold 338 and the behind threshold 340 can be dynamic. For example, the ahead threshold 338, the behind threshold 340, or a combination thereof can be a distance or a geographical marker relative to the communication party based on the navigational context 220, the external context, the emergency context 328, the current location 204, the traffic flow 302, the geographical grouping 304 or a combination thereof.

Figure 4:
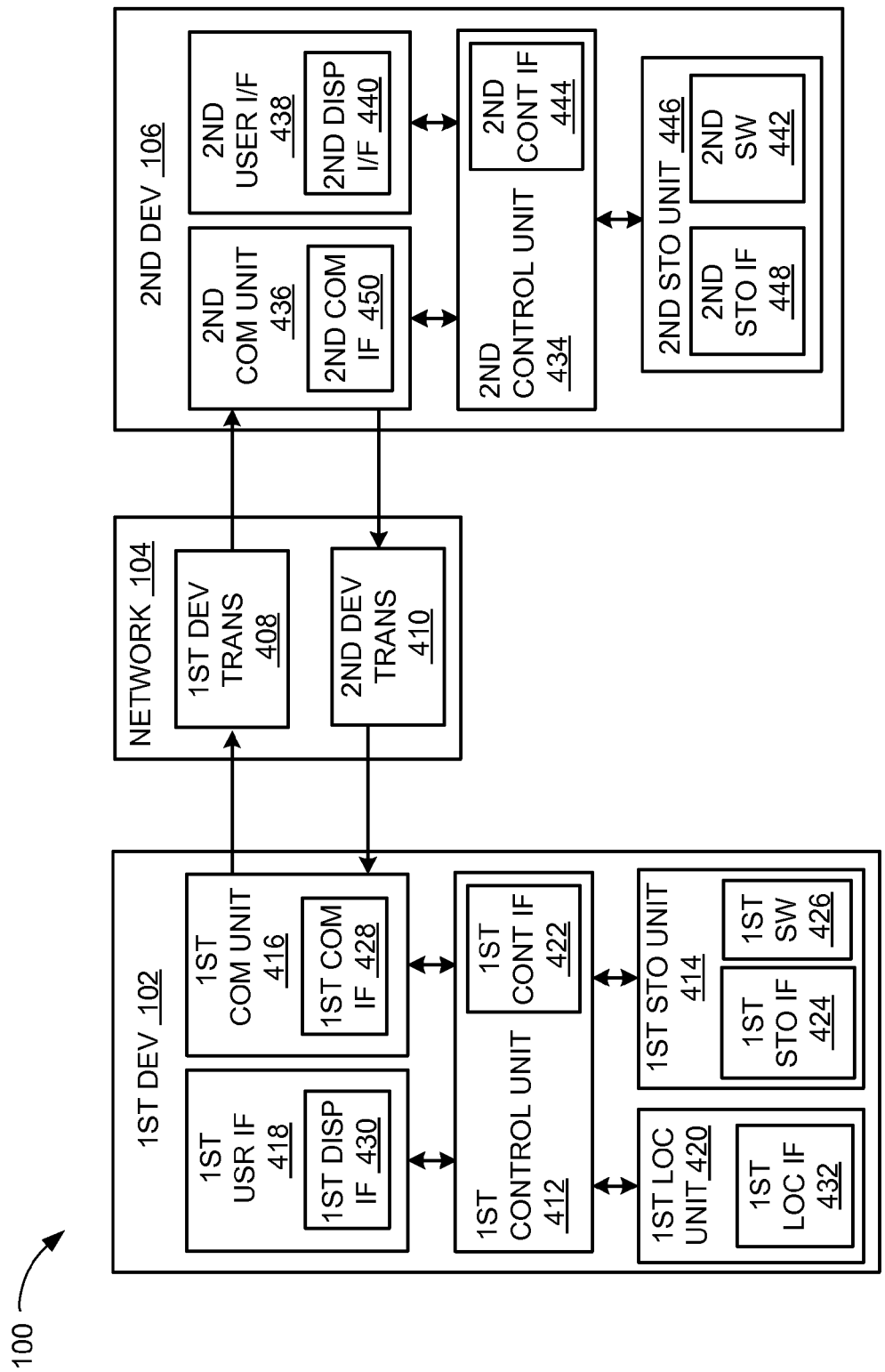
FIG. 4 is an exemplary block diagram of the navigation system.

Referring now to FIG. 4, therein is shown an exemplary block diagram of the navigation system 100. The navigation system 100 can include the first device 102, the network 104, and the second device 106. The first device 102 can send information in a first device transmission 408 over the network 104 to the second device 106. The second device 106 can send information in a second device transmission 410 over the network 104 to the first device 102.

For illustrative purposes, the navigation system 100 is shown with the first device 102 as a client device, although it is understood that the navigation system 100 can have the first device 102 as a different type of device. For example, the first device 102 can be a server having a display interface.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 412, a first storage unit 414, a first communication unit 416, and a first user interface 418, and a first location unit 420. The first control unit 412 can include a first control interface 422. The first control unit 412 can execute a first software 426 to provide the intelligence of the navigation system 100.

The first control unit 412 can be implemented in a number of different manners. For example, the first control unit 412 can be a processor, an application specific integrated circuit (ASIC) an embedded processor, a microprocessor, a hardware control logic, a hardware finite state machine (FSM), a digital signal processor (DSP), or a combination thereof. The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage unit 414 can store the first software 426. The first storage unit 414 can also store the relevant information, such as data representing incoming images, data representing previously presented image, sound files, or a combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the first storage unit 414 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106 of FIG. 1, an attachment, such as a peripheral device or a desktop computer, and the network 104.

The first communication unit 416 can also function as a communication hub allowing the first device 102 to function as part of the network 104 and not limited to be an end point or terminal unit to the network 104. The first communication unit 416 can include active and passive components, such as microelectronics or an antenna, for interaction with the network 104.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include an output device. The first display interface 430 can include a display, a projector, a video screen, a speaker, or any combination thereof.

The first control unit 412 can operate the first user interface 418 to display information generated by the navigation system 100. The first control unit 412 can also execute the first software 426 for the other functions of the navigation system 100, including receiving location information from the first location unit 420. The first control unit 412 can further execute the first software 426 for interaction with the network 104 via the first communication unit 416.

The first location unit 420 can generate location information, current heading, current acceleration, and current speed of the first device 102, as examples. The first location unit 420 can be implemented in many ways. For example, the first location unit 420 can function as at least a part of the global positioning system, an inertial navigation system, a cellular-tower location system, a pressure location system, or any combination thereof. Also, for example, the first location unit 420 can utilize components such as an accelerometer or GPS receiver.

The first location unit 420 can include a first location interface 432. The first location interface 432 can be used for communication between the first location unit 420 and other functional units in the first device 102. The first location interface 432 can also be used for communication external to the first device 102.

The first location interface 432 can receive information from the other functional units or from external sources, or can transmit information to the other functional units or to external destinations. The external sources and the external destinations refer to sources and destinations external to the first device 102.

The first location interface 432 can include different implementations depending on which functional units or external units are being interfaced with the first location unit 420. The first location interface 432 can be implemented with technologies and techniques similar to the implementation of the first control unit 412.

The second device 106 can be optimized for implementing an embodiment of the present invention in a multiple device embodiment with the first device 102. The second device 106 can provide the additional or higher performance processing power compared to the first device 102. The second device 106 can include a second control unit 434, a second communication unit 436, a second user interface 438, and a second storage unit 446.

The second user interface 438 allows a user (not shown) to interface and interact with the second device 106. The second user interface 438 can include an input device and an output device. Examples of the input device of the second user interface 438 can include a keypad, a touchpad, softkeys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the navigation system 100, including operating the second communication unit 436 to communicate with the first device 102 over the network 104.

The second control unit 434 can be implemented in a number of different manners. For example, the second control unit 434 can be a processor, an embedded processor, a microprocessor, hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations external to the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the information such as data representing incoming images, data representing previously presented image, sound files, or a combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 100 is shown with the second storage unit 446 as a single hierarchy storage system, although it is understood that the navigation system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the second storage unit 446 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the network 104.

The second communication unit 436 can also function as a communication hub allowing the second device 106 to function as part of the network 104 and not limited to be an end point or terminal unit to the network 104. The second communication unit 436 can include active and passive components, such as microelectronics or an antenna, for interaction with the network 104.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the network 104 to send information to the second device 106 in the first device transmission 408. The second device 106 can receive information in the second communication unit 436 from the first device transmission 408 of the network 104.

The second communication unit 436 can couple with the network 104 to send information to the first device 102 in the second device transmission 410. The first device 102 can receive information in the first communication unit 416 from the second device transmission 410 of the network 104. The navigation system 100 can be executed by the first control unit 412, the second control unit 434, or a combination thereof. For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the navigation system 100 is described by operation of the first device 102 and the second device 106. It is understood that the first device 102 and the second device 106 can operate any of the modules and functions of the navigation system 100.

Figure 5:
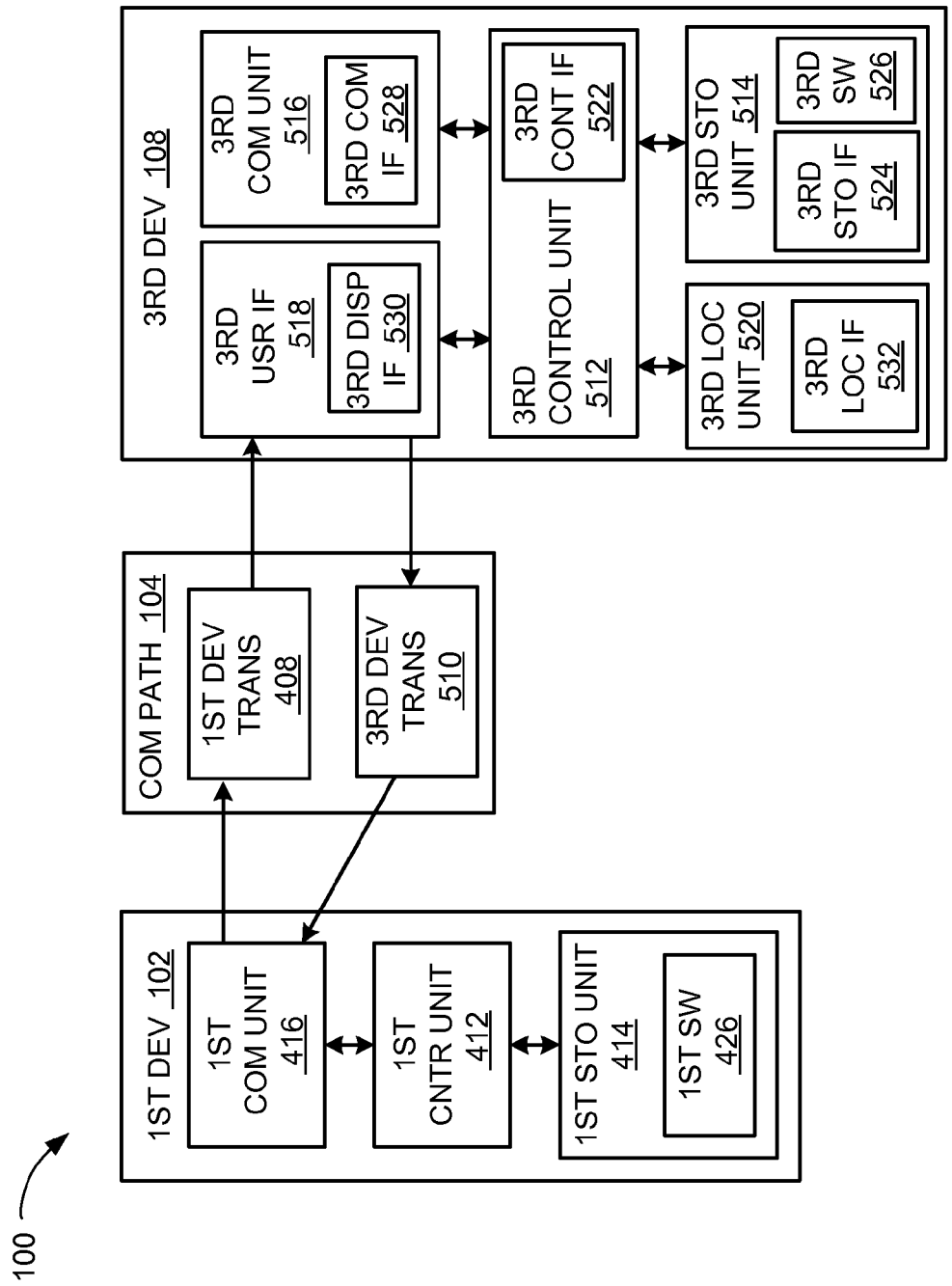
FIG. 5 is a further exemplary block diagram of the navigation system.

Referring now to FIG. 5, therein is shown a further exemplary block diagram of the navigation system 100. Along with the first device 102 and the second device 106 of FIG. 4, the navigation system 100 can include the third device 108. The first device 102 can send information in the first device transmission 408 over the communication path 104 to the third device 108. The third device 108 can send information in a third device transmission 510 over the communication path 104 to the first device 102, the second device 106, or a combination thereof.

For illustrative purposes, the navigation system 100 is shown with the third device 108 as a client device, although it is understood that the navigation system 100 can have the third device 108 as a different type of device. For example, the third device 108 can be a server.

Also for illustrative purposes, the navigation system 100 is shown with the first device 102 communicating with the third device 108. However, it is understood that the second device 106 can also communicate with the third device 108 in a similar manner as the communication between the first device 102 and the second device 106.

For brevity of description in this embodiment of the present invention, the third device 108 will be described as a client device. The embodiment of the present invention is not limited to this selection for the type of devices. The selection is an example of an embodiment of the present invention.

The third device 108 can be optimized for implementing an embodiment of the present invention in a multiple device or multiple user embodiments with the first device 102. The third device 108 can provide the additional or specific functions compared to the first device 102, the second device 106, or a combination thereof. The third device 108 can further be a device owned or used by a separate user different from the user of the first device 102.

The third device 108 can include a third control unit 512, a third storage unit 514, a third communication unit 516, a third user interface 518, and a third location unit 520. The third control unit 512 can include a third control interface 522. The third control unit 512 can execute a third software 526 to provide the intelligence of the navigation system 100.

The third control unit 512 can be implemented in a number of different manners. For example, the third control unit 512 can be a processor, an application specific integrated circuit (ASIC) an embedded processor, a microprocessor, a hardware control logic, a hardware finite state machine (FSM), a digital signal processor (DSP), or a combination thereof. The third control interface 522 can be used for communication between the third control unit 512 and other functional units in the third device 108. The third control interface 522 can also be used for communication that is external to the third device 108.

The third control interface 522 can receive information from the other functional units or from external sources, or can transmit information to the other functional units or to external destinations. The external sources and the external destinations refer to sources and destinations external to the third device 108.

The third control interface 522 can be implemented in different ways and can include different implementations depending on which functional units or external units are being interfaced with the third control interface 522. For example, the third control interface 522 can be implemented with a pressure sensor, an inertial sensor, a microelectromechanical system (MEMS), optical circuitry, waveguides, wireless circuitry, wireline circuitry, or a combination thereof.

The third storage unit 514 can store the third software 526. The third storage unit 514 can also store the relevant information, such as data representing incoming images, data representing previously presented image, sound files, or a combination thereof.

The third storage unit 514 can be a volatile memory, a nonvolatile memory, an internal memory, an external memory, or a combination thereof. For example, the third storage unit 514 can be a nonvolatile storage such as non-volatile random access memory (NVRAM), Flash memory, disk storage, or a volatile storage such as static random access memory (SRAM). Also for example, the third storage unit 514 can be distribution of storage elements, multiple hierarchy storage system including different levels of caching, main memory, rotating media, or off-line storage, or a combination thereof.

The third storage unit 514 can include a third storage interface 524. The third storage interface 524 can be used for communication between the third storage unit 514 and other functional units in the third device 108. The third storage interface 524 can also be used for communication that is external to the third device 108.

The third storage interface 524 can receive information from the other functional units or from external sources, or can transmit information to the other functional units or to external destinations. The external sources and the external destinations refer to sources and destinations external to the third device 108.

The third storage interface 524 can include different implementations depending on which functional units or external units are being interfaced with the third storage unit 514. The third storage interface 524 can be implemented with technologies and techniques similar to the implementation of the third control interface 522.

The third communication unit 516 can enable external communication to and from the third device 108. For example, the third communication unit 516 can permit the third device 108 to communicate with the second device 106, the first device 102, a different device, an attachment, such as a peripheral device or a desktop computer, the communication path 104, or a combination thereof.

The third communication unit 516 can also function as a communication hub allowing the third device 108 to function as part of the communication path 104 and not limited to be an end point or terminal unit to the communication path 104. The third communication unit 516 can include active and passive components, such as microelectronics or an antenna, for interaction with the communication path 104.

The third communication unit 516 can include a baseband device or component, a modem, a digital signal processor, or a combination thereof for transmitting, formatting, receiving, detecting, decoding, further processing, or a combination thereof for communication signals. The third communication unit 516 can include one or more portions for processing the voltages, the currents, the digital information, or a combination thereof, such as an analog-to-digital converter, a digital-to-analog converter, a filter, an amplifier, a processor-type circuitry, or a combination thereof. The third communication unit 516 can further include one or more portions for storing information, such as cache or RAM memory, registers, or a combination thereof.

The third communication unit 516 can include a third communication interface 528. The third communication interface 528 can be used for communication between the third communication unit 516 and other functional units in the third device 108. The third communication interface 528 can receive information from the other functional units or can transmit information to the other functional units.

The third communication interface 528 can include different implementations depending on which functional units are being interfaced with the third communication unit 516. The third communication interface 528 can be implemented with technologies and techniques similar to the implementation of the third control interface 522.

The third user interface 518 allows a user (not shown) to interface and interact with the third device 108. The third user interface 518 can include an input device and an output device. Examples of the input device of the third user interface 518 can include a keypad, a touchpad, soft-keys, a keyboard, a microphone, an infrared sensor for receiving remote signals, or any combination thereof to provide data and communication inputs.

The third user interface 518 can include a third display interface 530. The third display interface 530 can include an output device. The third display interface 530 can include a display, a projector, a video screen, a speaker, or any combination thereof.

The third control unit 512 can operate the third user interface 518 to display information generated by the navigation system 100. The third control unit 512 can also execute the third software 526 for the other functions of the navigation system 100, including receiving location information from the third location unit 520. The third control unit 512 can further execute the third software 526 for interaction with the communication path 104 via the third communication unit 516.

The third location unit 520 can generate location information, current heading, current acceleration, and current speed of the third device 108, as examples. The third location unit 520 can be implemented in many ways. For example, the third location unit 520 can function as at least a part of the global positioning system, an inertial computing system, a cellular-tower location system, a pressure location system, or any combination thereof. Also, for example, the third location unit 520 can utilize components such as an accelerometer or GPS receiver.

The third location unit 520 can include a third location interface 532. The third location interface 532 can be used for communication between the third location unit 520 and other functional units in the third device 108. The third location interface 532 can also be used for communication external to the third device 108.

The third location interface 532 can receive information from the other functional units or from external sources, or can transmit information to the other functional units or to external destinations. The external sources and the external destinations refer to sources and destinations external to the third device 108.

The third location interface 532 can include different implementations depending on which functional units or external units are being interfaced with the third location unit 520. The third location interface 532 can be implemented with technologies and techniques similar to the implementation of the third control unit 512.

For illustrative purposes, the third device 108 is shown with the partition having the third user interface 518, the third storage unit 514, the third control unit 512, and the third communication unit 516, although it is understood that the third device 108 can have a different partition. For example, the third software 526 can be partitioned differently such that some or all of its function can be in the third control unit 512 and the third communication unit 516. Also, the third device 108 can include other functional units not shown in FIG. 5 for clarity.

The functional units in the third device 108 can work individually and independently of the other functional units. The third device 108 can work individually and independently from the first device 102, the second device 106, and the communication path 104.

For illustrative purposes, the navigation system 100 is described by operation of the first device 102 and the third device 108. It is understood that the first device 102, the second device 106, and the third device 108 can operate any of the modules and functions of the navigation system 100.

Figure 6:
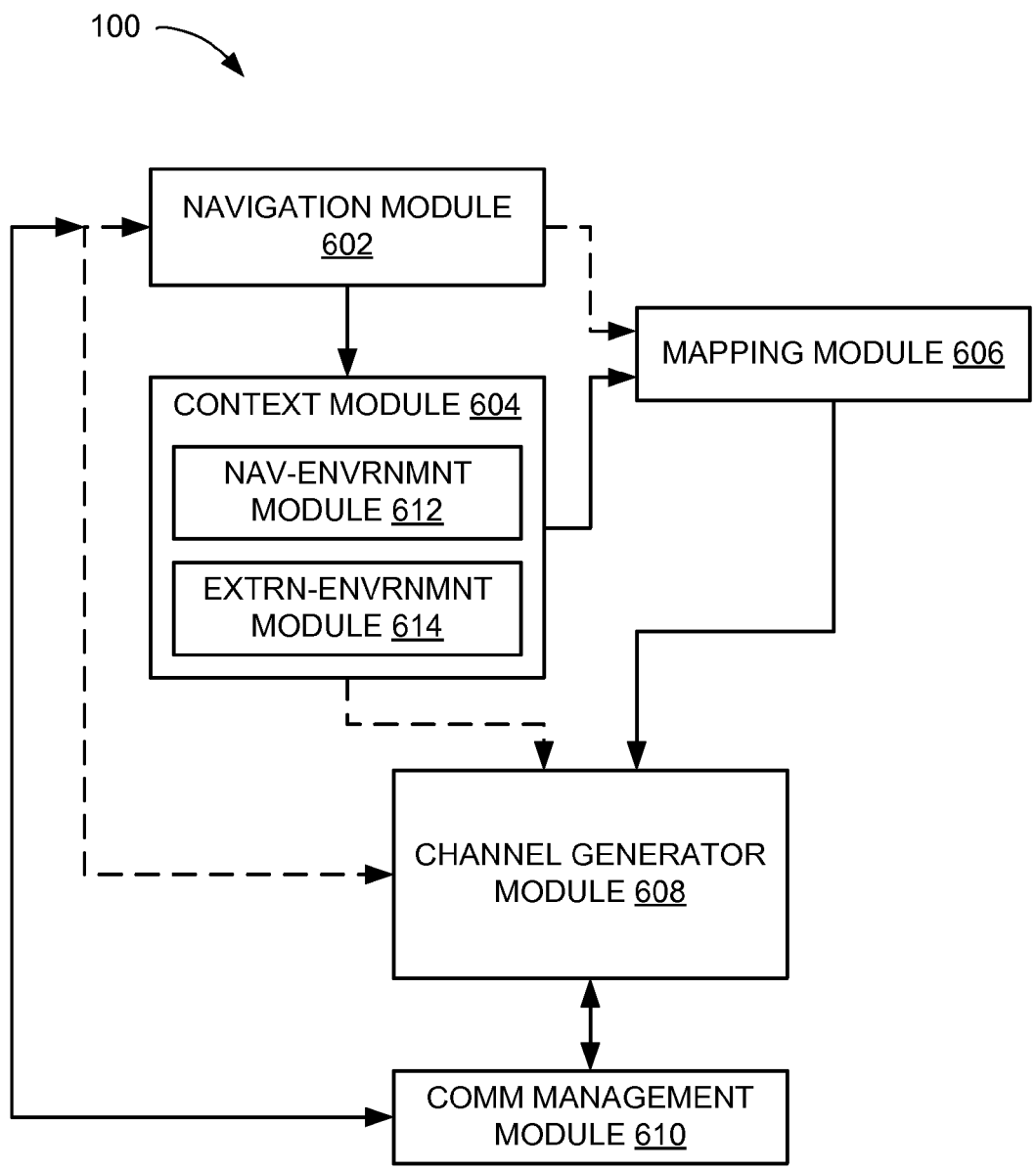
FIG. 6 is a control flow of the navigation system.

Referring now to FIG. 6, therein is shown a control flow of the navigation system 100. The navigation system 100 can include a navigation module 602, a context module 604, a mapping module 606, a channel generator module 608, a communication management module 610, or a combination thereof.

The navigation module 602 can be coupled to the context module 604, the mapping module 606, or a combination thereof using wired or wireless connections, by having an output of one module as an input of the other module, by having operations of one module influence operation of the other module, or a combination thereof. Similarly, the context module 604 can be coupled to the mapping module 606, the channel generator module 608, or a combination thereof, and the channel generator module 608 can be further coupled to the mapping module 606, the communication management module 610, or a combination thereof. The modules can be directly coupled with no intervening structures or objects other than the connector there-between or indirectly coupled.

The navigation module 602 is for providing functions or features associated with geographical locations for the end user. For example, the navigation module 602 can provide navigational guidance by generating and managing the navigation session 206 of FIG. 2. Also for example, the navigation module 602 can provide the current location 204 of FIG. 2 relative to a map, surrounding environment, or a combination thereof to the user 112 of FIG. 1, the participant 114 of FIG. 1.

The navigation module 602 can use the first location unit 420 of FIG. 4, the third location unit 520 of FIG. 5, the first communication unit 416 of FIG. 4, the second communication unit 436 of FIG. 4, the third communication unit 516 of FIG. 5, or a combination thereof to determine the current location 204. The navigation module 602 can use the first control unit 412 of FIG. 4, the second control unit 434 of FIG. 4, the third control unit 512 of FIG. 5, or a combination thereof to determine the map or the surrounding environment relative to the current location 204. The navigation module 602 can use the first user interface 418 of FIG. 4, the second user interface 438 of FIG. 4, the third user interface 518 of FIG. 5, the first communication unit 416, the second communication unit 436, the third communication unit 516, or a combination thereof to communicate the current location 204 relative to the map or the surrounding environment.

The navigation module 602 can further use the first user interface 418, the second user interface 438, the third user interface 518, the first communication unit 416, the second communication unit 436, the third communication unit 516 or a combination thereof to receive a request for the travel route 208 of FIG. 2 to the travel destination 210 of FIG. 2. The navigation module 602 can use the first control unit 412, the second control unit 434, the third control unit 512, or a combination thereof to generate the navigation session 206 corresponding to the request and further calculate the travel route 208 to the travel destination 210.

The navigation module 602 can access the map, edges, nodes, traffic regulations, points of interest (POI), address and coordinate associations, or a combination thereof stored in the first storage unit 414 of FIG. 4, the second storage unit 446 of FIG. 4, the third storage unit 514 of FIG. 5, or a combination thereof for calculating the travel route 208 and generating the navigation session 206. The navigation module 602 can further use a method or a process for calculating the travel route 208 and for generating the navigation session 206 as represented by the first software 426 of FIG. 4, the second software 442 of FIG. 4, the third software 526 of FIG. 5, or a combination thereof.

The navigation module 602 can communicate the navigation session 206 or information therein between devices using the first communication unit 416, the second communication unit 436, the third communication unit 516, or a combination thereof. The navigation module 602 can generate the navigation session 206 by reserving resources, communicating the navigational information or guidance information to the user 112 or the participant 114, or a combination thereof using the first user interface 418, the second user interface 438, the third user interface 518, or a combination thereof.

The navigation module 602 can update the navigation session 206 based on the current location 204, the travel direction 212 of FIG. 2, or a combination thereof from the first location unit 420, the third location unit 520, the first control unit 412, the second control unit 434, the third control unit 512, the first communication unit 416, the second communication unit 436, the third communication unit 516, or a combination thereof. The navigation module 602 can continue or adjust the navigation session 206 based on the current location 204 similar to the process described above.

The navigation module 602 can further use the non-contact command mechanism 218 of FIG. 2 to interact with the user. The navigation module 602 can use the first user interface 418, the second user interface 438, the third user interface 518, or a combination thereof excluding physical contact from the user 112 or the participant 114 to receive information there-from.

For example, the navigation module 602 can implement the first user interface 418, the second user interface 438, the third user interface 518, or a combination thereof using voice commands, motion or gesture commands, physiological commands, contextual interpretation mechanism, or a combination thereof. Also for example, the navigation module 602 can use the non-contact command mechanism 218 to recognize verbal or motion commands from the user 112 or the participant 114 for invoking communication with another party, such as for initiating the communication channel 222 of FIG. 2.

After or while providing functions or features associated with geographical locations, the control flow can pass from the navigation module 602 to the context module 604, the mapping module 606, the channel generator module 608, or a combination thereof. The control flow can pass to the context module 604 and the mapping module 606 for initiating, updating, providing information, or a combination thereof for processes described in detail below. The control flow can further pass to the channel generator module 608 based on the end user command for invoking a feature.

The control flow can pass by having a processing result, such as the navigation session 206 or the current location 204, as an output from the navigation module 602 to an input of the context module 604, the mapping module 606, or a combination thereof. The control flow can further pass by storing the processing result at a location known and accessible to the context module 604, the mapping module 606, the channel generator module 608, or a combination thereof. The control flow can further pass by notifying the context module 604, the mapping module 606, the channel generator module 608, such as by using a flag, an interrupt, a status signal, or a combination thereof. The control flow can further pass using a combination of the processes described above.

The context module 604 is for determining abstract value or situation regarding the user 112, the participant 114, or a combination thereof. The context module 604 can determine the navigational context 220 of FIG. 2, the external context, or a combination thereof. The context module 604 can include a navigation-environment module 612, an external-environment module 614, or a combination thereof.

The navigation-environment module 612 is for identifying the navigational context 220. The navigation-environment module 612 can identify the navigational context 220 for representing the user 112, the participant 114, or a combination thereof. The navigation-environment module 612 can identify the navigational context 220 by identifying the travel route 208, the travel destination 210, the travel purpose 214 of FIG. 2, the route segment 216 of FIG. 2 associated with the current location 204, or a combination thereof.

The navigation-environment module 612 can further identify a category, a value, a title, or a combination thereof representing a condition or a situation as predetermined by the navigation system 100. For example, the navigation-environment module 612 can identify the navigational context 220 based on accessing the navigation session 206 or parameters therein. Also for example, the navigation-environment module 612 can access a website, a link, a calendar application or database including the schedule event 242 of FIG. 2, a social-networking account, an address book or a contact list, an email, a text message, a phone log, a visual data, a to-do list, a reminder, a note, or a combination thereof associated with the user 112, the participant 114, or a combination thereof for identifying the navigational context 220.

As a more specific example, the navigation-environment module 612 can use the website, the link, the schedule event 242, or a combination thereof containing or invoking the navigation session 206 or providing the travel destination 210 for determining the travel purpose 214. Also as a more specific example, the navigation-environment module 612 can use a type of command or a sequence of commands, user-selected contents or options, or a combination thereof preceding or occurring during the navigation session 206 to identify the navigational context 220.

The navigation-environment module 612 can access and identify based on a process, a method, a collection of sources, a set of keywords, equations, categories or groupings, or a combination thereof specific for traveling and navigating as predetermined by the navigation system 100. The navigation-environment module 612 can further use models or clusters, machine-learning mechanism, pattern recognition mechanism, or a combination thereof to identify the navigational context 220.

The external-environment module 614 is for identifying the external context. For example, the external-environment module 614 can determine the usage profile 240 of FIG. 2, the schedule event 242, or a combination thereof. The external-environment module 614 can identify the external context for representing the user 112.

The external-environment module 614 can identify the external context similarly as the navigation-environment module 612 identifying the navigational context 220 as described above. For example, the external-environment module 614 can similarly use a category, a value, a title, or a combination thereof representing a condition or a situation as predetermined by the navigation system 100.

Also for example, the external-environment module 614 can access a website, a link, a calendar application or database including the schedule event 242, a social-networking account, an address book or a contact list, an email, a text message, a phone log, a visual data, a to-do list, a reminder, a note, or a combination thereof associated with the user 112, the participant 114, or a combination thereof. Also for example, the external-environment module 614 can use a type of command or a sequence of commands, user-selected contents or options, or a combination thereof preceding or occurring during the navigation session 206, during other uses for the first device 102 of FIG. 1, the second device 106 of FIG. 1, the third device 108 of FIG. 1, or a combination devices thereof, or a combination of conditions thereof.

As a more specific example, the external-environment module 614 can identify the schedule event 242 associated with the navigational context 220 for representing the user 112. The external-environment module 614 can identify the schedule event 242 coinciding with or independent of the travel purpose 214.

Continuing with the example, the external-environment module 614 can use a threshold, such as for a distance or time, a pattern or a connection in contextual parameters or categories, or a combination thereof predetermined by the navigation system 100 to compare an estimated arrival time, the travel destination 210, the travel purpose 214, or a combination thereof to other instances of the schedule event 242. The external-environment module 614 can identify the schedule event 242 satisfying the threshold, the pattern, or a combination thereof as the schedule event 242 associated with the navigational context 220, such as an event or a meeting occurring near, soon after, having related or similar context or purpose, having a relationship or a connection there-between, or a combination thereof in relation to the navigation session 206.

The external-environment module 614 can further store various information specific to each end user, such as user interactions, analyzed patterns, instances of the navigation session 206, or a combination thereof, as the usage profile 240 of FIG. 2. The external-environment module 614 can further identify, access, update, or a combination of processes thereof for the usage profile 240 as contextual input value in recognizing the navigational context 220, overall context surrounding the end user at the current time 202 of FIG. 2 or thereafter, or a combination thereof.

The context module 604 can use the navigational context 220, the external context, or a combination thereof to further identify the emergency context 328 of FIG. 3 for representing the user 112, the participant 114, or a combination thereof. The context module 604 can use the content filter 326 of FIG. 3 to identify the emergency context 328.

The context module 604 can process the contextual data or parameters from various sources as described above with the content filter 326. The content filter 326 can include specific parameters, keywords, conditions, or a combination thereof for recognizing the emergency context 328.

For example, the emergency context 328 can be represented by parameters, keywords, conditions, or a combination thereof representing urgency, a personal danger, a unique situation or a combination thereof. As a more specific example, the emergency context 328 can be represented by the travel destination 210 or queries for a hospital or a law enforcement service, a coinciding call to an emergency service, a key word communicated by or to the end user, a physiological or emotional indication from the end user, a presence or a movement of an emergency vehicle or personnel, or a combination thereof.

The context module 604 can use the first communication unit 416, the second communication unit 436, the third communication unit 516, or a combination thereof to identify, access, communicate, or a combination thereof for the contextual input parameters. The context module 604 can use the first control unit 412, the second control unit 434, the third control unit 512, or a combination thereof to determine or identify the navigational context 220 or the external context. The context module 604 can store the identified or determined context in the first storage unit 414, the second storage unit 446, the third storage unit 514, or a combination thereof.

After processing the contextual parameters, the control flow can pass from the context module 604 to the mapping module 606, the channel generator module 608, or a combination thereof. The control flow can pass similarly as described above between the navigation module 602 and the context module 604, but using processing results of the context module 604, such as the contextual parameters or determinations.

The mapping module 606 is for locating and tracking devices for the navigation system 100. The context module 604 can generate the geographical grouping 304 of FIG. 3 for the first device 102, the third device 108, or a combination thereof. The context module 604 can generate the geographical grouping 304 for describing a geographical relationship between end user devices.

The mapping module 606 can generate the geographical grouping 304 in a variety of methods. For example, the mapping module 606 can identify the current location 204 for each corresponding device relative to a map or a region of a map. Also for example, the mapping module 606 can identify or group instances of the end user devices, such as the participant identification 224 of FIG. 2 corresponding to the end user devices, according to geographical regions or instances of the route segment 216 of FIG. 2 predefined by the navigation system 100.

Also for example, the mapping module 606 can dynamically identify relative distances between devices, between devices and the travel route 208, or a combination thereof. The mapping module 606 can generate the geographical grouping 304 for each instance of subject end user device as all end user devices within a predetermined distance, threshold, or a combination thereof predetermined by the navigation system relative to the travel route 208, the travel destination 210, the current location 204, or a combination thereof associated with the subject end user devices.

The mapping module 606 can further associate the contextual information with the locations of the end users. The mapping module 606 can generate the geographical grouping 304 to include the navigation session 206, the navigational context 220, the external context associated thereto, or a combination thereof associated with or having a connection to the current location 204 for each of the end users. For example, the mapping module 606 can generate the geographical grouping 304 including the user-detail 306 of FIG. 3, the participant-detail 308 of FIG. 3, or a combination thereof representing the geographical location and contextual location of the user 112, the participant 114, or a combination thereof respectively.

The mapping module 606 can use the first location unit 420, the third location unit 520, the first communication unit 416, the second communication unit 436, the third communication unit 516, or a combination thereof to locate the end user devices. The mapping module 606 can use the use the first control unit 412, the second control unit 434, the third control unit 512, or a combination thereof to determine groupings of the end user devices to generate the geographical grouping 304. The mapping module 606 can store the geographical grouping 304 in the first storage unit 414, the second storage unit 446, the third storage unit 514, or a combination thereof.

After generating the geographical grouping 304, the control flow can pass from the mapping module 606 to the channel generator module 608. The control flow can pass similarly as described above between the navigation module 602 and the context module 604, but using processing results of the mapping module 606, such as the geographical grouping 304.

The channel generator module 608 is for facilitating communication between end users. The channel generator module 608 can facilitate by generating and managing the communication channel 222.

The channel generator module 608 can generate the communication channel 222 based on multiple triggers or factors. For example, the channel generator module 608 can generate the communication channel 222 based on a user command or input passed from the navigation module 602. As a more specific example, the channel generator module 608 can generate the communication channel 222 based on the non-contact command mechanism 218 of FIG. 2 or interactions with the user 112, the participant 114, or a combination thereof using the non-contact command mechanism 218.

Also for example, the channel generator module 608 can generate the communication channel 222 during the navigation session 206. Also for example, the channel generator module 608 can generate the communication channel 222 based on the emergency context 328. Also for example, the channel generator module 608 can generate the communication channel 222 based on the navigational context 220, the external context associated therewith, or a combination thereof.

The channel generator module 608 can generate the communication channel 222 for communicating the contextual broadcast 336 of FIG. 3 according to the emergency context 328, the navigational context 220, the external context associated therewith, or a combination thereof. The channel generator module 608 can generate the communication channel 222 for communicating the message 228 of FIG. 2 to correct or relevant instance of the participant identification 224 of FIG. 2.

The channel generator module 608 can generate the communication channel 222 using the communication traffic control 310 of FIG. 3. The channel generator module 608 can invoke the communication traffic control 310 based on the triggers described above. The channel generator module 608 can further pass the triggers described above to the communication traffic control 310.

The communication traffic control 310 can generate the communication channel 222 by reserving resources dedicated to communication between specific combination of end users, such as for computing capability or time slot, memory allotment, frequency or formats associated with communication, a session or an identification associated there-with, or a combination thereof. The communication traffic control 310 can further generate the communication channel 222 by determining the relevant or correct instance of the participant identification 224 corresponding to communicating parties to generate the communication channel 222.

For example, from the perspective of the user 112 utilizing the communication feature to send or receive the message 228, the channel generator module 608 can use the communication traffic control 310 to generate the communication channel 222 based on the navigational context 220 for communicating the message 228 between the user 112 and the participant 114. The communication traffic control 310 can generate the communication channel 222 by determining the relevant or correct instance of the participant 114 through the participant identification 224 or a device associated thereto, such as the third device 103.

The channel generator module 608 can use the communication traffic control 310 to determine the participant identification 224 in a variety of ways. For example, the channel generator module 608 can determine based on the navigational context 220, the external context associated thereto, the geographical grouping 304 or a combination thereof.

The channel generator module 608 can determine based on the navigational context 220 by determining the participant identification 224 associated with common or related instances of the navigational context 220, the external context associated thereto, or a combination thereof. For example, the channel generator module 608 can generate the communication channel 222 based on the travel route 208, the travel destination 210, the travel direction 212, the travel purpose 214, the schedule event 242, the usage profile 240, or a combination thereof.

As a more specific example, the channel generator module 608 can determine the participant identification 224 for the communication channel 222 based on common, matching, associated, or a combination of relationships thereof for the travel route 208, the travel destination 210, the travel direction 212, the travel purpose 214, the schedule event 242, or a combination thereof between the user 112 and the participant 114. Also as a more specific example, the channel generator module 608 can determine the participant identification 224 based additionally on the familiarity rating 226 of FIG. 2 for representing a relationship between the user 112 and a candidate instance of the participant 114 for the communication channel 222.

The channel generator module 608 can determine associations, relationships, similarities, or a combination thereof based on values, processes, methods, or a combination thereof predetermined by the navigation system 100. The channel generator module 608 can further determine associations, relationships, similarities, or a combination thereof based on groupings, clusters, models, or a combination thereof resulting from the machine-learning mechanism.

The channel generator module 608 can further determine the participant identification 224 based on more than user selections, more than static distance from the user 112, or a combination thereof. The channel generator module 608 can determine the participant identification 224 without the user 112 specifically designating or selecting the participant identification 224, independent of the familiarity rating 226, or a combination thereof based on the navigational context 220, the external context associated thereto, or a combination thereof.

For example, the channel generator module 608 can determine the participant identification 224 as the one or more instance of the participant 114 travelling to a common instance of the travel destination 210, having a common instance of the travel purpose 214, having a common instance of the schedule event 242 or a portion therein associated with the navigation session 206, or a combination thereof without the user 112 specifying, selecting, or identifying a grouping for a caravan. Also for example, the channel generator module 608 can determine the participant identification 224 with strangers having relevant connection to the user 112 to communicate with the user 112 and exchange relevant instances of the message 228.

The channel generator module 608 can further determine the participant identification 224 based on the geographical grouping 304. The channel generator module 608 can determine the participant identification 224 from the set of candidate instances of the participant-detail 308 having common or associated contexts.

The channel generator module 608 can identify the geographical grouping 304 relevant to the navigational context 220, the external context associated thereto, the traffic flow 302 of FIG. 3, or a combination thereof. The channel generator module 608 can calculate or adjust the ahead threshold 338 of FIG. 3, the behind threshold 340 of FIG. 3, or a combination thereof based on the navigational context 220, the external context associated thereto, or a combination thereof.

For example, the channel generator module 608 can calculate or adjust the ahead threshold 338, the behind threshold 340, or a combination thereof based on a statistical distribution or analysis based on the contextual information and geographical information. Also for example, the channel generator module 608 can calculate or adjust the ahead threshold 338, the behind threshold 340, or a combination thereof based on the usage profile 240 associating areas or distances to significant locations relevant to context.

Also for example, the channel generator module 608 can utilize the machine-learning mechanism or the pattern analysis mechanism to calculate or adjust the ahead threshold 338, the behind threshold 340, or a combination thereof. Also for example, the channel generator module 608 can specify a set of distances or ranges, an equation, a rule or a condition, or a combination thereof corresponding to the navigational context 220, the external context associated thereto, the traffic flow 302, or a combination thereof as the ahead threshold 338, the behind threshold 340, or a combination thereof.

The channel generator module 608 can identify a significant location associated with the navigational context 220, the external context associated thereto, or a combination thereof relative to the initiation of the communication channel 222. The channel generator module 608 can identify the significant location from the current location 204, the travel destination 210, the schedule location 244 of FIG. 2, or a combination thereof.

The channel generator module 608 can identify the significant location based on the traffic flow 302, various contextual parameters, the usage profile 240, or a combination thereof. The channel generator module 608 can identify the significant location similarly as described above, such as based on the machine-learning mechanism, the pattern analysis, the statistical analysis, or a combination thereof predetermined by the navigation system 100.

The channel generator module 608 can determine the geographical grouping 304 based on the significant location, the ahead threshold 338, the behind threshold 340, or a combination thereof. For example, the channel generator module 608 can determine the geographical grouping 304 associated with the communication channel 222 as the geographical grouping 304 including the significant location.

Also for example, the channel generator module 608 can determine the geographical grouping 304 associated with the communication channel 222 as the geographical grouping 304 beyond, at, or within the ahead threshold 338, the behind threshold 340, or a combination thereof from the significant location. Also for example, the channel generator module 608 can determine the geographical grouping 304 associated with the communication channel 222 as the geographical grouping 304 along the travel route 208, within the same instance of the route segment 216 as the user 112, or a combination thereof and beyond, at, or within the ahead threshold 338, the behind threshold 340, or a combination thereof relative to the significant location.

The channel generator module 608 can determine the participant identification 224 based on the participant-detail 308 satisfying both contextual and geographical conditions described above, and belonging to both the set determined by the contexts and the geographical grouping 304. The channel generator module 608 can determine the participant identification 224 based on more than a static or permanent reference point and distance.

The channel generator module 608 can determine the participant identification 224 based on dynamic instances of the ahead threshold 338, the behind threshold 340, or a combination thereof utilizing the navigational context 220, the external context associated thereto, or a combination thereof. Moreover, the channel generator module 608 can determine the participant identification 224 based on the significant location most relevant to the context for the communication channel 222 without being limited to a preset reference location.

The channel generator module 608 can determine the user 112 and the participant 114, the first device 102 and the third device 108 respectively associated thereto, or a combination thereof as the communication grouping 236 of FIG. 2. The user 112 can be associated with one or more instances of the communication grouping 236 each based on unique set of context. The channel generator module 608 can further determine multiple instances of the participant identification 224 satisfying the above described conditions as the communication grouping 236.

The channel generator module 608 can manage the communication of the message 228 using the communication traffic control 310 by generating the session type 312 of FIG. 3. The channel generator module 608 can use the communication traffic control 310 to generate the session type 312 including the throughput mode 314 of FIG. 3, the restorable mode 316 of FIG. 3, the simultaneous mode 318 of FIG. 3, the sequential mode 320 of FIG. 3, or a combination thereof.

The channel generator module 608 can generate the session type 312 by determining settings, configurations, or a combination thereof. For example, the channel generator module 608 can configure one or more storage units to store the message 228 for the message queue 322 of FIG. 3, for storage after delivering the message 228 to the intended recipient, or a combination thereof. Also for example, the channel generator module 608 can set up the delivery mechanism, such as multiplexing or mixing of signals, for delivering one or multiple instances of independent message 228. Also for example, the channel generator module 608 can initiate a method or a process for identifying or matching previously stored instance of the message 228 in response to an input from the user 112.

As a more specific example, the channel generator module 608 can configure the first device 102, the second device 106, the third device 108, the communication traffic control 310, or a combination thereof to establish a dedicated channel or connection between corresponding parties for the throughput mode 314. Also as a more specific example, the channel generator module 608 can configure to store and re-access the message 228 after delivery for the message 228 in the restorable mode 316.

Also as a more specific example, the channel generator module 608 can configure to multiplex multiple independent instances of the message 228 and replay to one or multiple end user devices for the simultaneous mode 318. The channel generator module 608 can configure to multiplex or combine in real-time or with minimal delay.

Also as a more specific example, the channel generator module 608 can configure to generate the message queue 322, implement the communication sequence 324 of FIG. 3, or a combination thereof. The channel generator module 608 can configure the communication traffic control 310 to store the instances of the message 228 transmitted by the user 112, the participant 114, or a combination thereof. The channel generator module 608 can further configure the communication traffic control 310 to assign an order or a timing for delivering or communicating the message 228 to the intended target.

The channel generator module 608 can determine the privacy setting 230 of FIG. 2 for the communication channel 222. The channel generator module 608 can determine the privacy setting 230 according to the navigational context 220, the external context associated therewith, or a combination thereof. The channel generator module 608 can determine the privacy setting 230 as the public setting 232 of FIG. 2 or the private setting 234 of FIG. 2 according to contextual parameters associated with the setting values as predetermined by the navigation system 100.

The channel generator module 608 can generate, update, or adjust the communication channel 222 based on the mute setting 238 of FIG. 2. The channel generator module 608 can generate, update, or adjust the communication channel 222 for specifically silencing the message 228 from the participant 114 for the perspective of the user 112.

The channel generator module 608 can use the mute setting 238 to not deliver or communicate the message 228 from the specified instance of the participant 114 to the user 112 controlling the mute setting 238. The channel generator module 608 can determine the mute setting 238 based on previous setting values in the usage profile 240, based on selection or input from the user 112, or a combination thereof.

The channel generator module 608 can use the mute setting 238 in generating the communication channel 222 by determining the participant identification 224 unrelated to the mute setting 238. The channel generator module 608 can adjust or update the communication channel 222 by removing the corresponding instance of the participant identification 224, by notifying the communication management module 610, or a combination thereof.

The channel generator module 608 can further generate the communication channel 222 for specific circumstances, without selection or acknowledgement from the receiving or intended communication party. For example, the channel generator module 608 can generate the communication channel 222 based on the emergency context 328, the mute override 334 of FIG. 3, the contextual broadcast 336, or a combination thereof. The channel generator module 608 can generate the communication channel 222 for ensuring communication of the message 228 to the participant 114, the user 112, or a combination thereof intended for receiving the message 228.

The channel generator module 608 can generate the mute override 334 based on determination of the emergency context 328 by the context module 604. The channel generator module 608 can generate the mute override 334 for necessary situations when delivering the message 228 is warranted as represented by the emergency context 328.

The channel generator module 608 can further notify the communication management module 610 for communicating the message 228 as the contextual broadcast 336. The channel generator module 608 can generate the communication channel 222 corresponding to the contextual broadcast 336 by determining the participant identification 224 accordingly, such as end users within a predetermined distance.

For example, the channel generator module 608 can generate the communication channel 222 to include one, multiple, or all instances of the end users along the travel route 208, the travel direction 212, within the common instance of the route segment 216, or a combination thereof for the user 112 experiencing emergency or urgent situation, traveling to an emergency service, or a combination thereof. Also for example, the channel generator module 608 can generate the communication channel 222 identifying the participant identification 224 to include all upcoming or approaching vehicles or end users for broadcast available for the user 112 providing emergency service.

It has been discovered that the communication traffic control 310 based on the navigational context 220 provides real-time communication between relevant users. The communication traffic control 310 can determine the participant identification 224 sharing a common context with the user 112, without being limited by the familiarity rating 226 and utilizing a larger base of potential participants.

It has further been discovered that the communication traffic control 310 including the restorable mode 316 provides improved usability and relevance for the user 112. The communication traffic control 310 can analyze the message 228 representing a request or a question from the user 112 and provide relevant and previously stored instance of the message 228 representing a response or an answer. The communication traffic control 310 can provide the response even when no participants qualify as a communication party at the current time 202 of the request from the user 112.

It has further been discovered that the communication channel 222 based on the navigational context 220 provides real-time communication between relevant users. The communication channel 222 can communicate the message 228 relevant to the context of the user 112 with the participant identification 224 sharing a common context therewith, without being limited by the familiarity rating 226 and without being limited by a static distance requirement.

It has further been discovered that the communication channel 222 based on the schedule event 242 associated with the navigational context 220 provides enhanced usability and increased amount of relevant and accessible information to the user 112. The communication channel 222 can communicate the message 228 relevant to the context of the user 112 beyond the travel destination 210 or the travel purpose 214 and including the schedule event 242 occurring at a near time and location associated with the travel destination 210 or the schedule event 242 having contextual connection to the travel destination 210 or the travel purpose 214.

The channel generator module 608 can use the first user interface 418, the second user interface 438, the third user interface 518, the first communication unit 416, the second communication unit 436, the third communication unit 516, or a combination thereof to receive triggering input from the user 112, the participant 114, or a combination thereof. The channel generator module 608 can use the first control interface 422 of FIG. 4, the second control interface 444 of FIG. 4, the third control interface 522 of FIG. 5, or a combination thereof to receive the triggering input for generating the communication channel 222.

The channel generator module 608 can use the first control unit 412, the second control unit 434, the third control unit 512, or a combination thereof to implement the communication traffic control 310 in generating the communication channel 222 with configuring the various units, identifying the participant identification 224, or a combination thereof. The channel generator module 608 can further generate the communication channel 222 by configuring the first user interface 418, the second user interface 438, the third user interface 518, or a combination thereof to communicate the message 228 with the user 112, the participant 114, or a combination thereof. The channel generator module 608 can implement and store the communication traffic control 310, the communication channel 222, or a combination thereof in the first storage unit 414, the second storage unit 446, the third storage unit 514, or a combination thereof.

After generating the communication channel 222, the control flow can pass from the channel generator module 608 to the communication management module 610. The control flow can pass similarly as described above between the navigation module 602 and the context module 604, but using processing results of the communication management module 610, such as the communication channel 222 and the communication traffic control 310.

The communication management module 610 is for managing the communication channel 222. The communication management module 610 can manage the communication channel 222 using the communication traffic control 310.

The communication management module 610 can manage the communication channel 222 by controlling the delivery of the message 228 to the user 112, the participant 114, or a combination thereof. For example, the communication management module 610 can filter the message 228, order or sequence multiple instances of the message 228, control a timing for delivering the message 228, delivering or communicating the message 228 to the user 112, the participant 114, or a combination thereof.

The communication management module 610 can receive the message 228 with the communication traffic control 310. The communication management module 610 can receive the message 228 with the communication traffic control 310 using the first control unit 412, the second control unit 434, the third control unit 512, or a combination thereof.

The communication management module 610 can implement the throughput mode 314 for the communication traffic control 310 by delivering the message 228 to the first device 102, the third device 108, or a combination thereof without any additional delays. The communication management module 610 can pass the message 228 to the navigation module 602 corresponding to the first device 102, the third device 108, or a combination thereof. The navigation module 602 can communicate the message 228 to the user 112, the participant 114, or a combination thereof.

The communication management module 610 can implement the restorable mode 316 for the communication traffic control 310 by storing the message 228, delivering the message 228, or a combination thereof. The communication management module 610 can further determine a timing or an instance having relevance for the stored instance of the message 228 based on the navigational context 220, the external context, or a combination thereof at the current time 202, accessing the stored instance of the message 228 and redelivering the message 228.

The communication management module 610 can implement the simultaneous mode 318 by using the multiplexing scheme or method generated with the communication traffic control 310 by the channel generator module 608 to combine multiple instances of the message 228. The communication management module 610 can pass the simultaneous multiple instances of the message 228 or a multiplexed instance of the message 228 to the navigation module 602 corresponding to the first device 102, the third device 108, or a combination thereof. The navigation module 602 can simultaneously communicate the multiple coexisting instances of the message 228 to the user 112, the participant 114, or a combination thereof.

The communication management module 610 can implement the sequential mode 320 by storing the received instance of the message 228 in the message queue 322. The communication management module 610 can use the communication traffic control 310 to determine the communication sequence 324 for the instances of the message 228 within the message queue 322. The communication management module 610 can use the first-in first-out scheme for delivering the message 228 according an order in which the instances of the message 228 have arrived at the communication traffic control 310.

The communication management module 610 can further determine the communication sequence 324 based on contextual relevance. The communication management module 610 can compare the contextual parameters, such as the timing there-between or keywords in the messages.

The channel generator module 608 can further arrange or order a delivery or a playback of the received message for implementing the communication sequence 324 based on a degree of relevance, such as between the message 228 and the navigational context 220, the external context, or a combination thereof. The communication management module 610 can determine the communication sequence 324 for minimizing the time between a received instance of the message 228 and the most relevant instance of a subsequently received message 228.

The channel generator module 608 can filter the message 228. The channel generator module 608 can filter the message 228 in a variety of ways. For example, the channel generator module 608 can filter the message 228 using the content filter 326, the mute setting 238, or a combination thereof.

The channel generator module 608 can use the content filter 326 by determining the inappropriate content 330 of FIG. 3, the redundant content 332 of FIG. 3, or a combination thereof. The channel generator module 608 can compare the message 228 to the keywords, patterns, or a combination thereof representing the inappropriate content 330, the redundant content 332, or a combination thereof.

The channel generator module 608 can further use the content filter 326 by determining the contextual relevance of the message 228 to the communication channel 222, one or more preceding instance of the message 228, the navigational context 220, the external context associated thereto, or a combination thereof. The channel generator module 608 can determine the contextual relevance using methods or processes described above, such as keyword matching, machine learning models or clusters, patterns, or a combination thereof.

The channel generator module 608 can remove, delete from memory, not deliver, respond to the sender, or a combination thereof for the message 228 determined by the content filter 326 as the inappropriate content 330, the redundant content 332, or a combination thereof. The channel generator module 608 can similarly remove, delete from memory, not deliver, respond to the sender, or a combination thereof for the message 228 or the corresponding parties associated with or marked by the mute setting 238.

The channel generator module 608 can further deliver and communicate the contextual broadcast 336, deliver and communicate the message 228 based on the mute override 334, or a combination thereof. For example, the channel generator module 608 can deliver the message 228 corresponding to the emergency context 328 based on the mute override 334, such that even the communication parties utilizing the mute setting 238 can ensure communication of the message 228 having the emergency context 328. Also for example, the channel generator module 608 can deliver the message 228 corresponding to the emergency context 328 as the contextual broadcast 336 to parties contextually associated with the sending party, geographically associated with the sending party, or a combination thereof.

The channel generator module 608 can further deliver and communicate specific instances of the message 228 having contextual relevance across instances of the communication channel 222. For example, the channel generator module 608 can deliver and communicate specific instance of the message 228 relevant to one instance of the communication channel 222 when the specific instance of the message 228 originates from a party in a different instance of the communication channel 222.

The channel generator module 608 can deliver and communicate the message 228 across instances of the communication channel 222 as the contextual broadcast 336. The channel generator module 608 can compare the contextual parameters as exemplified above to multiple instances of the communication channel 222 and the contextual parameters associated therewith or the instances of the message 228 therein. The channel generator module 608 can determine the message 228 as the contextual broadcast 336 when the message 228 matches or is associated with the contextual parameters associated with different independent instance of the communication channel 222.

It has been discovered that the communication traffic control 310 including the sequential mode 320 and the content filter 326 provides efficient and appropriate communication for the user 112. The message queue 322 can buffer simultaneous or multiple instances of the message 228 and the content filter 326 can be used to eliminate the redundant content 332 and reduce redundancy to promote efficient communication between multiple parties. Similarly, the content filter 326 can be used to eliminate inappropriate or offensive instance of the message 228 relative to the contextual parameters to ensure a quality of the communication channel 222 potentially including strangers.

It has been further discovered that the communication traffic control 310 including the content filter 326 and the familiarity rating 226 provides contextually relevant and customizable filter function. The communication traffic control 310 can adjust the content filter 326, such as the emergency context and the inappropriate content 330, according to a relationship between communicating parties, the contextual parameters accessible to the communication traffic control 310, or a combination thereof.

It has been further discovered that the communication traffic control 310 including the contextual broadcast 336 based on the geographical grouping 304 provides coordination of activities and cooperation between strangers. The contextual broadcast 336 can be used to request assistance from relevant end users. The relevant end users can be determined based on the geographical grouping 304 and the contextual parameters accessible to the communication traffic control 310.

The channel generator module 608 can use the first user interface 418, the second user interface 438, the third user interface 518, the first communication unit 416, the second communication unit 436, the third communication unit 516, or a combination thereof to deliver and communicate the message 228. The channel generator module 608 can use the first control unit 412, the second control unit 434, the third control unit 512, or a combination thereof to manage the communication channel 222.

The modules described in this application can be hardware implementation or hardware accelerators, including passive circuitry, active circuitry, or both, in the first storage unit 414, the second storage unit 446, the third storage unit 514, the first control unit 416, the second control unit 438, the third control unit 516, or a combination thereof. The modules can also be hardware implementation or hardware accelerators, including passive circuitry, active circuitry, or both, within the first device 102, the second device 106, the third device 108, or a combination thereof but outside of the first storage unit 414, the second storage unit 446, the third storage unit 514, the first control unit 416, the second control unit 438, the third control unit 516, or a combination thereof.

The navigation system 100 has been described with module functions or order as an example. The navigation system 100 can partition the modules differently or order the modules differently. For example, the navigation module 602, the mapping module 606, the context module 604, the channel generator module 608 can be implemented in a series configuration as described above or in a parallel configuration, as shown by dashed lines, for continuously executing independent of each other and sharing relevant data to trigger above described process.

Also for example, the channel generator module 608 can determine the participant identification 224 by determining a relevant instance of the geographical grouping 304 based on the navigational context 220, the external context associated thereto, or a combination thereof in the user-detail 306, the participant-detail 308, or a combination thereof. The process of determining the participant identification 224 based on one or more participants therein having matching or associated instances of the navigational context 220, the external context associated thereto, or a combination thereof can be performed after, before, or in parallel with the process of determining the participant identification 224.

For illustrative purposes, the various modules have been described as being specific to the first device 102, the second device 106, the third device 108, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first storage unit 414, the second storage unit 446, the third storage unit 514, or a combination thereof can represent the non-transitory computer readable medium. The first storage unit 414, the second storage unit 446, the third storage unit 514, or a combination thereof, or a portion therein can be removable from the first device 102, the second device 106, the third device 108, or a combination thereof. Examples of the non-transitory computer readable medium can be a non-volatile memory card or stick, an external hard disk drive, a tape cassette, or an optical disk.

The physical transformation from the message 228 using the communication channel 222 results in the movement in the physical world, such as content displayed or recreated for the user on one or more of the devices or physical displacement of the user 112 utilizing the first device 102. Movement in the physical world results in updates to the current location 204, the navigational context 220, the external context associated thereto, or a combination thereof, which can be fed back into the navigation system 100 and further influence the communication traffic control 310.

Figure 7:
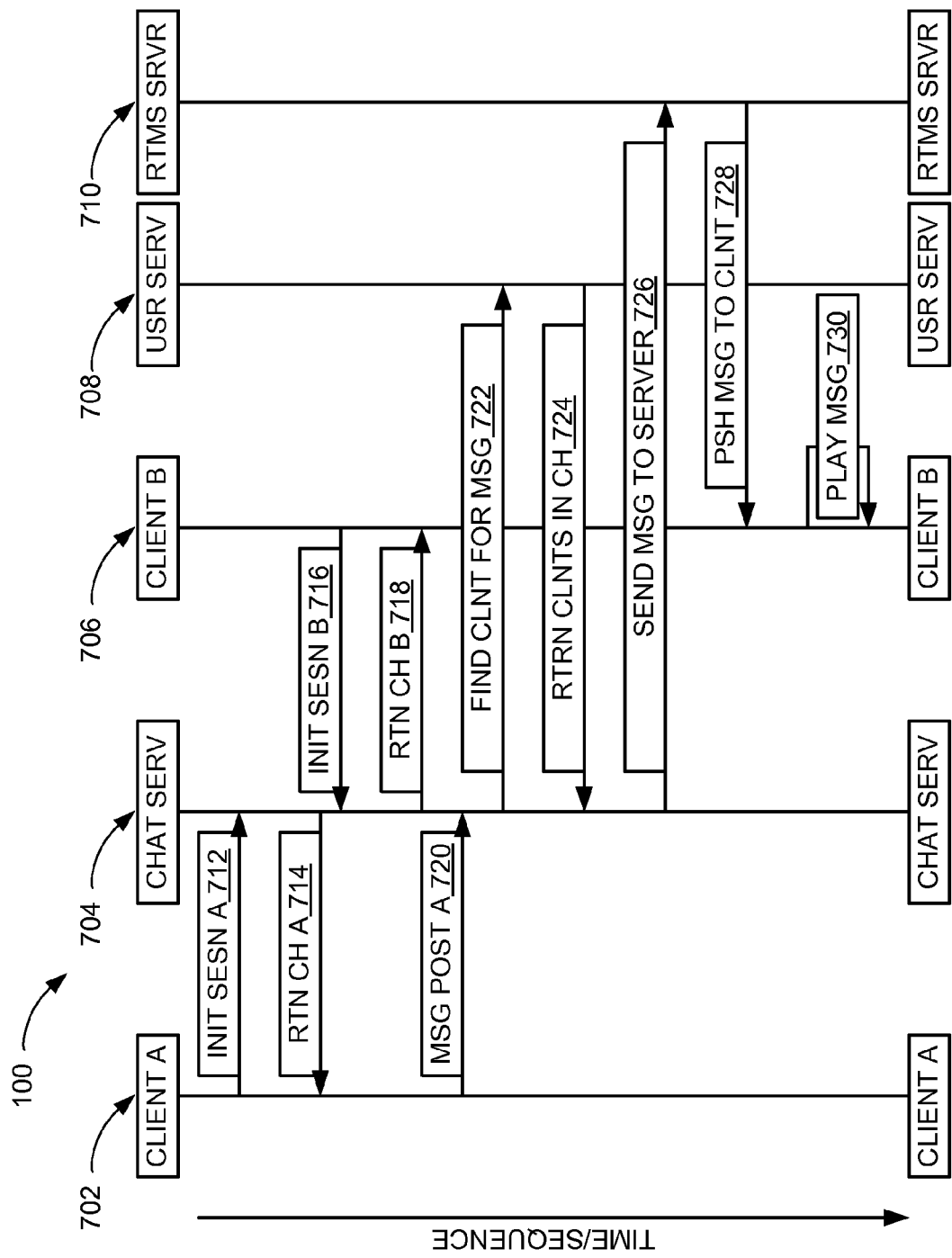
FIG. 7 is a detailed example flow of the navigation system.

Referring now to FIG. 7, therein is shown a detailed example flow of the navigation system 100. The detailed example flow can show an interaction between a first client 702, a chat service 704, a second client 706, a user graph service 708, a server 710, or a combination thereof. The first client 702 can include the user 112 of FIG. 1, the first device 102 of FIG. 1, or a combination thereof. The second client 706 can include the participant 114 of FIG. 1, the third device 108 of FIG. 1, or a combination thereof. The second device 106 of FIG. 1, the communication traffic control 310 of FIG. 3, or a combination thereof can include the chat service 704, the user graph service 708, the server 710, or a combination thereof.

The navigation system 100 can initialize the communication traffic control 310, the communication channel 222 of FIG. 2, a communication session, or a combination thereof based on a first initialization request 712. The first initialization request 712 can include a communication between the first client 702 and the chat service 704.

The first initialization request 712 can include the communication according to a predetermined protocol sent from the first client 702 to the chat service 704. The first initialization request 712 can be for initializing a communication session for the first client 702, including a walkie-talkie session, as described above. The channel generator module 608 of FIG. 6 can communicate the first initialization request 712 between the devices.

The channel generator module 608 can use the chat service 704 to generate the communication channel 222 based on the first initialization request 712. The channel generator module 608 can then communicate a first connection 714. The first connection 714 can include a message or a communication for finalizing an instance of the communication channel 222.

The first connection 714 can notify the first client 702 about the details, formats, protocols, or a combination thereof relevant for utilizing the communication channel 222. The first connection 714 can include return of walkie-talkie channel from the chat service 704 to the first client 702. The first connection 714 can be a return communication to the first connection 714 or a source of the first initial initialization request 712.

The channel generator module 608 can similarly facilitate a communication session for the second client 706. For example, the second client 706 can send a second initialization request 716 to the chat service 704. The channel generator module 608 can use the chat service 704 to generate a further instance of the communication channel 222 for the second client 706. The channel generator module 608 can then communicate a second connection 718 finalizing the further instance of the communication channel 222 from the chat service 704 to the second client 706.

For illustrative purposes, the user 112 is described as establishing the communication channel 222 before the participant 114. However, it is understood that the channel generator module 608 can initialize and manage the various instances of the communication channel 222 separately and independently. For example, the further instance of the communication channel 222 with the second client 706 can be before, concurrent to, overlapping or a combination thereof relative to the instance of the communication channel 222 for the first client 702.

For exemplifying the operation of the navigation system 100, the detailed example flow can show the first client 702 sending a content-message 720. The content-message 720 can include the message 228 of FIG. 2 generated by the first client 702, intended to be communicated to another identified or random-qualifying participant. The content-message 720 can be communicated using or according to the communication channel 222 corresponding to the first client 702.

The communication management module 610 of FIG. 6 can communicate the message 228, including sending, receiving, or a combination thereof. The communication management module 610 can communicate the message 228 with respect to the first client 702, the chat service 704, the second client 706, the user graph service 708, the server 710, or a combination thereof.

The chat service 704 can generate a recipient identification request 722 based on receiving the content-message 720. The recipient identification request 722 can include a communication or a setting for requesting identification of a communication counterpart to the content-message 720. The channel generator module 608, the communication module 610, or a combination thereof can generate and communicate the recipient identification request 722 between the chat service 704 and the user graph service 708. For example, the chat service 704 can send the recipient identification request 722 to the user graph service 708.

The channel generator module 608, the communication module 610, or a combination thereof can use the user graph service 708 to identify the communication counterpart for the content-message 720 based on the recipient identification request 722. The user graph service 708 can search the instances of the participant 114 connected to the chat service 704, the instances of the communication channel 222 for each client, or a combination thereof. The user graph service 708 can find and identify the communication counterpart for the content-message 720 based on relevant contextual information as described above.

The channel generator module 608, the communication module 610, or a combination thereof can use the user graph service 708 to send a recipient identification 724 identifying the communication counterpart for the content-message 720. For example, the recipient identification 724 can identify the second client 706 as an appropriate client for communicating the content-message 720. The recipient identification 724 can identify the second client 706, one or more instances of the participant 114, or a combination thereof. The channel generator module 608, the communication module 610, or a combination thereof can communicate the recipient identification 724 from the user graph service 708 to the chat service 704.

The channel generator module 608, the communication module 610, or a combination thereof can use the chat service 704 to send message to server, as represented in a box 726. The chat service 704 can identify the server 710 appropriate for communicating with the identified recipient. The chat service 704 can forward the recipient identification 724, the content-message 720, or a combination thereof to the server 710 corresponding to the identified recipient.

The channel generator module 608, the communication module 610, or a combination thereof can establish or complete the communication channel 222 or the communication grouping 236 of FIG. 2 based on the recipient identification 724, operations of the user graph service 708, the operations in the box 726, or a combination thereof. The channel generator module 608, the communication module 610, or a combination thereof can use the server 710 to complete the end-to-end communication.

The server 710 can push or communicate message to client as represented in a box 728. The server 710 can send the content-message 720 to the second client 706 identified according to the recipient identification 724. The second client 708 can play message, as represented in a box 730. The second client 708 can communicate the content-message 720 based on audibly or visually recreating the content-message 720 for communication with a person.

The first client 702, the second client 706, or a combination thereof can communicate or process the content-message 720 using the first user interface 418 of FIG. 4, the second user interface 438 of FIG. 4, the third user interface 518 of FIG. 5, or a combination thereof. The first client 702, the chat service 704, the second client 706, the user graph service 708, the server 710, or a combination thereof can communicate information using the first communication unit 416 of FIG. 4, the second communication unit 436 of FIG. 4, the third communication unit 516 of FIG. 4, the first control interface 422 of FIG. 4, the second control interface 444 of FIG. 4, the third control interface 522 of FIG. 5, or a combination thereof.

The first client 702, the chat service 704, the second client 706, the user graph service 708, the server 710, or a combination thereof can process the various information described above using the first control unit 412 of FIG. 4, the second control unit 434 of FIG. 4, the third control unit 512 of FIG. 5, or a combination thereof. The first client 702, the chat service 704, the second client 706, the user graph service 708, the server 710, or a combination thereof can store the received information, the processing results, or a combination thereof in the first storage unit 414 of FIG. 4, the second storage unit 446 of FIG. 4, the third storage unit 514 of FIG. 5, or a combination thereof.

Figure 8:
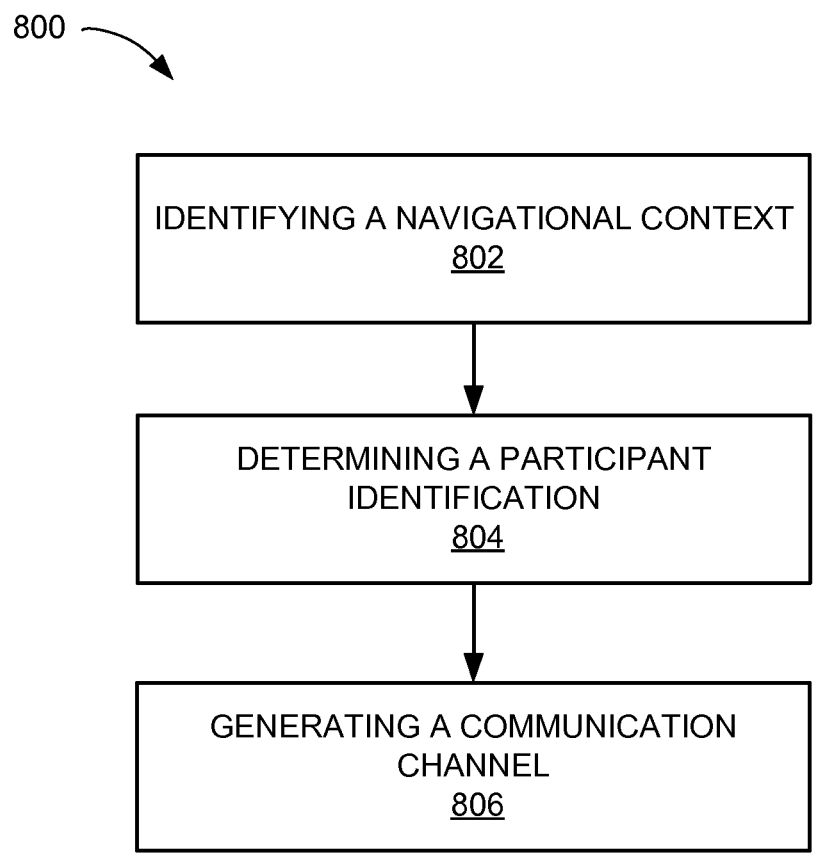
FIG. 8 is a flow chart of a method of operation of a navigation system in an embodiment of the present invention.

Referring now to FIG. 8, therein is shown a flow chart of a method 800 of operation of a navigation system 100 in an embodiment of the present invention. The method 800 includes: identifying a navigational context for representing a user in a block 802; determining a participant identification based on the navigational context for representing a participant, the participant identification including a familiarity rating in a block 804; and generating a communication channel with a control unit during a navigation session based on the navigational context for communicating a message between the user and the participant independent of the familiarity rating in a block 806.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of a navigation system comprising:
   identifying a navigational context including a travel route for representing a user;
   determining a participant identification based on the navigational context for representing a participant, the participant identification, wherein the participant is a person or an entity different from the user and operating one or more devices different from the user; and
   generating a communication channel with a control unit, including reserving a frequency dedicated to the participant identification, during a navigation session for the travel route based on the navigational context for communicating a message between the user and the participant including a common and matching portion of the travel route.

2. The method as claimed in claim 1 wherein:
generating the communication channel includes generating the communication channel based on the travel route.

3. The method as claimed in claim 1 wherein:
identifying the navigational context includes identifying a travel purpose; and
generating the communication channel includes generating the communication channel based on the travel purpose.

4. The method as claimed in claim 1 further comprising:
identifying a schedule event associated with the navigational context for representing the user; and
wherein:
generating the communication channel includes generating the communication channel based on the schedule event.

5. The method as claimed in claim 1 wherein generating the communication channel includes generating the communication channel using a communication traffic control for managing the communication channel.

6. The method as claimed in claim 1 further comprising:
determining a mute setting for communicating to the user; and
wherein:
generating the communication channel includes generating the communication channel based on the mute setting for specifically silencing the message from the participant.

7. The method as claimed in claim 1 generating the communication channel includes generating the communication channel based on a mute override associated with the navigational context for ensuring communication of the message to the participant.

8. The method as claimed in claim 1 wherein:
identifying the navigational context includes identifying an emergency context for representing the user;
generating the communication channel includes generating a contextual broadcast based on the emergency context for communicating the contextual broadcast according to the emergency context.

9. The method as claimed in claim 1 wherein generating the communication channel includes generating a session type including a throughput mode, a restorable mode, a simultaneous mode, a sequential mode, or a combination thereof.

10. The method as claimed in claim 1 wherein generating the communication channel includes generating the communication channel based on a non-contact command mechanism.

11. A navigation system comprising:
a control unit configured to:
identify a navigational context including a travel route for representing a user,
determine a participant identification based on the navigational context for representing a participant, the participant identification, wherein the participant is a person or an entity different from the user and operating one or more devices different from the user;
generate a communication channel, including reserving a frequency dedicated to the participant identification, during a navigation session for the travel route based on the navigational context for communicating a message between the user and the participant including a common and matching portion of the travel route; and
a communication unit, coupled to the control unit, configured to communicate the message.

12. The system as claimed in claim 11 wherein the control unit is configured to:
identify the travel route; and
generate the communication channel based on the travel route.

13. The system as claimed in claim 11 wherein the control unit is configured to:
identify a travel purpose; and
generate the communication channel based on the travel purpose.

14. The system as claimed in claim 11 wherein the control unit is configured to:
identify a schedule event associated with the navigational context for representing the user; and
generate the communication channel based on the schedule event.

15. The system as claimed in claim 11 wherein the control unit is configured to generate the communication channel using a communication traffic control for managing the communication channel.

16. A non-transitory computer readable medium including instructions for a navigation system comprising:
identifying a navigational context including a travel route for representing a user;
determining a participant identification based on the navigational context for representing a participant, the participant identification, wherein the participant is a person or an entity different from the user and operating one or more device different from the user; and
generating a communication channel, including reserving a frequency dedicated to the participant identification, during a navigation session for the travel route based on the navigational context for communicating a message between the user and the participant including a common and matching portion of the travel route.

17. The non-transitory computer readable medium as claimed in claim 16 further comprising:
generating the communication channel includes generating the communication channel based on the travel route.

18. The non-transitory computer readable medium as claimed in claim 16 further comprising:
identifying the navigational context includes identifying a travel purpose; and
generating the communication channel includes generating the communication channel based on the travel purpose.

19. The non-transitory computer readable medium as claimed in claim 16 further comprising:
identifying a schedule event associated with the navigational context for representing the user; and
wherein:
generating the communication channel includes generating the communication channel based on the schedule event.

20. The non-transitory computer readable medium as claimed in claim 16 wherein generating the communication channel includes generating the communication channel using a communication traffic control for managing the communication channel.

* * * * *